US010203876B2

United States Patent
Ogawa

(10) Patent No.: US 10,203,876 B2
(45) Date of Patent: Feb. 12, 2019

(54) STORAGE MEDIUM APPARATUS, METHOD, AND PROGRAM FOR STORING NON-CONTIGUOUS REGIONS

(71) Applicant: NEC Corporation, Tokyo (JP)

(72) Inventor: Shugo Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 121 days.

(21) Appl. No.: 15/037,830

(22) PCT Filed: Nov. 21, 2014

(86) PCT No.: PCT/JP2014/080848
§ 371 (c)(1),
(2) Date: May 19, 2016

(87) PCT Pub. No.: WO2015/076354
PCT Pub. Date: May 28, 2015

(65) Prior Publication Data
US 2016/0274792 A1    Sep. 22, 2016

(30) Foreign Application Priority Data
Nov. 22, 2013    (JP) .................................. 2013-241900

(51) Int. Cl.
*G06F 3/06* (2006.01)
*G06F 12/02* (2006.01)
*G06F 12/10* (2016.01)

(52) U.S. Cl.
CPC ............ *G06F 3/0605* (2013.01); *G06F 3/061* (2013.01); *G06F 3/064* (2013.01); *G06F 3/067* (2013.01);
(Continued)

(58) Field of Classification Search
CPC ...... G06F 3/0605; G06F 3/061; G06F 3/0631; G06F 3/064; G06F 3/0659; G06F 3/0665;
(Continued)

(56) References Cited

U.S. PATENT DOCUMENTS 6,137,763 A * 10/2000 Dahan .................... G06F 3/0613
369/124.02
6,779,081 B2 * 8/2004 Arakawa .............. G11B 19/125
707/999.202
(Continued)

FOREIGN PATENT DOCUMENTS

JP    2004-164370 A    6/2004
JP    2010-237907 A    10/2010
(Continued)

OTHER PUBLICATIONS

International Search Report corresponding to PCT/JP2014/080848, dated Dec. 16, 2014 (3 pages).
(Continued)

*Primary Examiner* — Francisco A Grullon
(74) *Attorney, Agent, or Firm* — Wilmer Cutler Pickering Hale and Dorr LLP

(57) ABSTRACT

A storage apparatus manages collectively, as a group, a predetermined number of contiguous units of storage in the storage medium, selects a group, the number of the units of storage in a free state in the group satisfying an access performance set condition, when securing a storage region for storing write data, and sets a group in which the units of storage in a free state are distributed non-contiguously as a group to be selected, associates an address specified by a write access request and an address of the unit of storage in a free state in the selected group, and sequentially write the write data to the unit of storage in a free state included in the group.

21 Claims, 22 Drawing Sheets

(52) U.S. Cl.
CPC .......... *G06F 3/0631* (2013.01); *G06F 3/0659* (2013.01); *G06F 3/0665* (2013.01); *G06F 3/0676* (2013.01); *G06F 12/023* (2013.01); *G06F 12/10* (2013.01); *G06F 2212/7201* (2013.01)

(58) Field of Classification Search
CPC .......... G06F 3/0676; G06F 2212/7201; G06F 12/023; G06F 12/10
See application file for complete search history.

(56) References Cited

U.S. PATENT DOCUMENTS

| | | | |
|---|---|---|---|
| 7,143,262 B2 | 11/2006 | Serizawa | |
| 7,840,536 B1* | 11/2010 | Ahal | G06F 17/30191 |
| | | | 707/648 |
| 9,454,536 B1* | 9/2016 | Rao | G06F 17/30135 |
| 2004/0098537 A1* | 5/2004 | Serizawa | G06F 3/0613 |
| | | | 711/112 |
| 2004/0202073 A1* | 10/2004 | Lai | G06F 3/0625 |
| | | | 369/47.33 |
| 2005/0228963 A1* | 10/2005 | Rothman | G06F 3/0613 |
| | | | 711/170 |
| 2017/0308464 A1* | 10/2017 | Hwang | G06F 3/0604 |

FOREIGN PATENT DOCUMENTS

| | | |
|---|---|---|
| JP | 2012-178017 A | 9/2012 |
| JP | 2012-185855 A | 9/2012 |

OTHER PUBLICATIONS

Mendel Rosenblum et al., "The LFS Storage Manager," Computer Science Division, Electrical Engineering and Computer Sciences, University of California, Jun. 11, 1990 (16 pages).

Mendel Rosenblum et al., "The Design and Implementation of a Log-Structured File System," Electrical Engineering and Computer Sciences, Computer Sciences Division, University of California, Jul. 24, 1991 (15 pages).

* cited by examiner

FIG. 3

221: ACCESS REQUEST TABLE

| ID | R/W | LEADING ADDRESS OF ACCESS DESTINATION | ACCESS LENGTH | REQUEST SOURCE HOST | CORRESPONDING COMMAND ID |
|---|---|---|---|---|---|
| 1 | Read | 0x00001000 | 16 | HOST A | 1, 2 |
| 2 | Write | 0x00001104 | 12 | HOST A | 3, 4 |
| 3 | Read | 0x00002000 | 8 | HOST B | 5 |
| ⋮ | ⋮ | ⋮ | ⋮ | ⋮ | ⋮ |

FIG. 4

231: ADDRESS CONVERSION TABLE

| LOGICAL ADDRESS | STORAGE MEDIUM ID | PHYSICAL ADDRESS |
|---|---|---|
| 0x00001000 | 1 | 0x00100000 |
| 0x00001008 | 1 | 0x00100008 |
| 0x00001010 | 2 | 0x00010000 |
| ⋮ | ⋮ | ⋮ |
| 0x00001100 | 1 | 0x00200000 |
| 0x00001108 | 1 | 0x00200008 |
| 0x00001100 | 1 | 0x00200010 |
| ⋮ | ⋮ | ⋮ |
| 0x00002000 | 2 | 0x00010000 |
| ⋮ | ⋮ | ⋮ |

FIG. 5

241: COMMAND TABLE

| ID | R/W | STORAGE MEDIUM ID | ACCESS DESTINATION ADDRESS | CORRESPONDING ACCESS REQUEST ID |
|---|---|---|---|---|
| 1 | Read | 1 | 0x00100000 | 1 |
| 2 | Read | 1 | 0x00100008 | 1 |
| 3 | Write | 1 | 0x00200000 | 2 |
| 4 | Write | 1 | 0x00200008 | 2 |
| 5 | Read | 2 | 0x00010000 | 3 |
| ⋮ | ⋮ | ⋮ | ⋮ | ⋮ |

FIG. 6

| STORAGE MEDIUM ID | LEADING ADDRESS | ALLOCATION INFORMATION |
|---|---|---|
| 1 | 0x00100000 | 00000000000000010000000000000001 |
| 1 | 0x00100100 | 11111111111111111111111111111101 |
| 1 | 0x00100200 | 01010101010101010101010101010101 |
| ⋮ | ⋮ | ⋮ |

251: PAGE GROUP TABLE

FIG. 7

271: PERFORMANCE REQUIREMENT TABLE

| REQUIREMENT | SET VALUE |
|---|---|
| PERFORMANCE LOWER LIMIT | 10MB/s |
| PERFORMANCE UPPER LIMIT | 30MB/s |

FIG. 11

221A: ACCESS REQUEST TABLE

| ID | R/W | LEADING ADDRESS OF ACCESS DESTINATION | ACCESS LENGTH (BLOCK) | REQUEST SOURCE HOST | CORRESPONDING COMMAND ID |
|---|---|---|---|---|---|
| 1 | Read | 0x00001000 | 16 | HOST A | 1, 2 |
| 2 | Write | 0x00002000 | 8 | HOST A | 3 |
| 3 | Write | 0x00003000 | 8 | HOST A | 4 |
| ⋮ | ⋮ | ⋮ | ⋮ | ⋮ | ⋮ |

FIG. 12

231A: ADDRESS CONVESION TABLE

| LOGICAL ADDRESS | STORAGE MEDIUM ID | PHYSICAL ADDRESS |
|---|---|---|
| 0x00001000 | 1 | 0x00100000 |
| 0x00001008 | 1 | 0x00100008 |
| ⋮ | ⋮ | ⋮ |
| 0x00002000 | 1 | 0x00200000 |
| ⋮ | ⋮ | ⋮ |
| 0x00003000 | 1 | 0x00200018 |
| ⋮ | ⋮ | ⋮ |

FIG. 13

241A: COMMAND TABLE

| ID | R/W | STORAGE MEDIUM ID | ADDRESS OF ACCESS DESTINATION | CORRESPONDING ACCESS REQUEST ID |
|---|---|---|---|---|
| 1 | Read | 1 | 0x00100000 | 1 |
| 2 | Read | 1 | 0x00100008 | 1 |
| 3 | Write | 1 | 0x00200000 | 2 |
| 4 | Write | 1 | 0x00200018 | 3 |
| ⋮ | ⋮ | ⋮ | ⋮ | ⋮ |

FIG. 14

*251A: PAGE GROUP TABLE*

| STORAGE MEDIUM ID | LEADING ADDRESS | ALLOCATION INFORMATION |
|---|---|---|
| 1 | 0x00200000 | 01100000000000110110000000000011 |
| 1 | 0x00200100 | 11111111111111111111111111111101 |
| 1 | 0x00200200 | 01110111011101110111011101110111 |
| 1 | 0x00200300 | 00000000000000000000000000000000 |
| ⋮ | ⋮ | ⋮ |

FIG. 15

271A: PERFORMANCE REQUIREMENT TABLE

| REQUIREMENT | SET VALUE |
|---|---|
| PERFORMANCE LOWER LIMIT | 10MB/s |
| PERFORMANCE UPPER LIMIT | 20MB/s |

FIG. 16

*221B* : ACCESS REQUEST TABLE

| ID | R/W | LEADING ADDRESS OF ACCESS DESTINATION | ACCESS LENGTH (BLOCK) | REQUEST SOURCE HOST | CORRESPONDING COMMAND ID |
|---|---|---|---|---|---|
| 1 | Read | 0x00001000 | 16 | HOST A | 1, 2 |
| 2 | Write | 0x00002000 | 8 | HOST A | 3 |
| 3 | Write | 0x00003000 | 8 | HOST A | 4 |
| ⋮ | ⋮ | ⋮ | ⋮ | ⋮ | ⋮ |

FIG. 17

231B : ADDRESS CONVERSION TABLE

| LOGICAL ADDRESS | STORAGE MEDIUM ID | PHYSICAL ADDRESS |
|---|---|---|
| 0x00001000 | 1 | 0x00100000 |
| 0x00001008 | 1 | 0x00100008 |
| ⋮ | ⋮ | ⋮ |
| 0x00002000 | 1 | 0x00200000 |
| ⋮ | ⋮ | ⋮ |
| 0x00003000 | 1 | 0x00200018 |
| ⋮ | ⋮ | ⋮ |

FIG. 18

241B: COMMAND TABLE

| ID | R/W | STORAGE MEDIUM ID | ADDRESS OF ACCESS DESTINATION | CORRESPONDING ACCESS REQUEST ID |
|---|---|---|---|---|
| 1 | Read | 1 | 0x00100000 | 1 |
| 2 | Read | 1 | 0x00100008 | 1 |
| 3 | Write | 1 | 0x00200000 | 2 |
| 4 | Write | 1 | 0x00200018 | 3 |
| ⋮ | ⋮ | ⋮ | ⋮ | ⋮ |

FIG. 19

251B : PAGE GROUP TABLE

| STORAGE MEDIUM ID | LEADING ADDRESS | ALLOCATION INFORMATION |
|---|---|---|
| 1 | 0x00200000 | 01100000000000110110000000000011 |
| 1 | 0x00200100 | 11111111111111111111111111111101 |
| 1 | 0x00200200 | 01110111011101110111011101110111 |
| 1 | 0x00200300 | 11111111111111110000000000000000 |
| ⋮ | ⋮ | ⋮ |

FIG. 20

271B:PERFORMANCE
REQUEST TABLE

| REQURIMENT | SET VALUE |
|---|---|
| MINIMUM UNUSED PAGE RATE | 50% |

FIG. 22A

```
AA+0 ┌─────────────┐
     │  a:valid    │
  +2 ├─────────────┤
     │  b:invalid  │
  +6 ├─────────────┤
     │  c:valid    │
  +8 ├─────────────┤
     │             │
     │  d:invalid  │
 +12 ├─────────────┤
     │  e:valid    │
 +14 ├─────────────┤
     │  f:invalid  │
 +16 ├─────────────┤
     │      ⋮      │
 +63 └─────────────┘
```

FIG. 22B

```
BB+0 ┌─────────────┐
     │  a:valid    │
  +2 ├─────────────┤
     │  c:valid    │
  +4 ├─────────────┤
     │  e:valid    │
  +6 ├─────────────┤
     │      ⋮      │
     │             │
     │   UNUSED    │
     │   REGION    │
     │             │
     └─────────────┘
```

FIG. 22C

```
AA+0 ┌─────────────┐
     │             │
     │             │
     │             │
     │  Free Block │
     │ (FREE REGION)│
     │             │
     │             │
     │             │
     └─────────────┘
```

FIG. 22D

| LOGICAL ADDRESS | PHYSICAL ADDRESS |
|---|---|
| LAa | (AA+0->)BB+0 |
| LAc | (AA+6->)BB+2 |
| LAe | (AA+12->)BB+4 |
| ⋮ | ⋮ |

STORAGE MEDIUM APPARATUS, METHOD, AND PROGRAM FOR STORING NON-CONTIGUOUS REGIONS

TECHNICAL FIELD

Reference To Related Application

This application is a national stage application of International Application No. PCT/JP2014/080848, filed on Nov. 21, 2014, which claims priority to Japanese Patent Application No. 2013-241900, filed on Nov. 22, 2013, the disclosures of which are incorporated herein in their entirety The present invention relates to a storage apparatus, a method, and a program.

BACKGROUND

Along with development of information technology and expansion of an application field of the information technology, an amount of data to be handled by an information processing system has increased. Thus, a larger capacity and higher performance of a storage configured to store data are demanded for an information processing system of each field.

A method of aggregating data in a plurality of systems into a single storage, for example, has been used so as to increase efficiency in storage management. In this arrangement, a storage capacity for storing a large amount of data and high performance for processing a large amount of accesses from the plurality of systems at high speed are demanded for the storage.

<HDD>

By employing as a storage medium, an HDD (Hard Disk Drive) whose capacity has been increased, an increase in the demand for the storage capacity can be accommodated. Further, by increasing the number of storage media that constitute the storage, the demand for the storage capacity can be flexibly accommodated.

<Cache>

A cache, for example, is employed in order to speed up access to a storage. The cache is constituted, for example, by a DRAM (Dynamic Random Access Memory) or the like. The cache for a storage stores temporarily a duplicate or an update of data stored in the storage medium such as the HDD. Assume that the data in an HDD or the like is temporarily stored in the cache. Then, when an access is performed from a host side to the storage, the number of accesses to the storage medium such as the HDD is reduced when there is a cache hit. As a result, improvement of access performance can be achieved. However, the cache has a smaller capacity than a storage medium such as an HDD. For this reason, in the case of a read or a write of data with an amount exceeding the storage capacity of the cache, an effect of improvement of access performance using the cache is limited.

<Striping>

Striping, for example, is employed as means for improving access performance for a storage medium such as an HDD. In the striping (also referred to as RAID 0 (Redundant Arrays of Inexpensive Disks 0), data is divided with a predetermined size, and divided data are alternately distributed into a plurality of HDDs (storage media) for write or read, thereby achieving speeding-up. Two or more drives (HDDs) are needed for the striping (RAID 0). The striping (RAID 0) has no redundancy. When just one drive fails, for example, all the data in a disk array are lost. By increasing the number of the drives in the disk array in the striping (RAID 0), access performance can be improved. However, in accordance with an increase in the number of drives (number of HDDs) in the disk array, a failure rate may also increase.

<SSD>

A method of storing data in a high-speed storage medium is employed as means for improving access performance. An SSD (Solid State Drive), for example, is employed in a storage as a high-speed storage medium (storage device). Generally, an SSD comprises a flash memory (collectively erasable type and programmable non-volatile memory), in particular, a NAND-type flash memory. Though an SSD has lower access performance than a DRAM, an SSD has higher-speed access performance than an HDD. Though an SSD has a smaller storage capacity than an HDD, an SSD can implement a storage medium with a larger capacity than a DRAM. Generally, an SSD is more expensive than an HDD and is limited in the number of times of data writes due to a characteristic of a NAND-type flash memory.

In a NAND-type flash memory, write and read accesses are each performed for each page (of approximately 4 KB (Kilo Bytes), for example, though not limited thereto). Generally, this page size is smaller than a block size (of 256 KB, for example) that is a unit of a collective erasure operation. In the NAND-type flash memory, it is necessary to perform collective erasure of a block that includes written data, on a per block basis, in order to newly write data into a page or the block into which data has been already written.

When a write request such as a random write is made from a host to the storage including an SSD as a storage medium, and old data has been already written in a page of a write destination, writing of data is performed as follows:

reading, into a DRAM or the like, each page (of 4 KB, for example) other than a target of an overwrite requested by the write request, from a block (of 256 KB=64 pages, for example) corresponding to a logical address range of the write request;

erasing the block;

combining, on the DRAM or the like, write data (overwrite target page) requested by the write request and each of pages other than the overwrite target that have been read in the DRAM or the like;

writing back data obtained by the combination on the DRAM or the like into the block in the SSD from the DRAM or the like, on a per page basis; and updating a correspondence (address management information) between a page address (physical address) of the data written into the block in the SSD and a logical address used for access to the data from the host.

As mentioned above, when an overwrite to a page including already written data occurs in an SSD, generally, a size in a write operation or in a read operation will become larger as compared with a size of data requested for a write from the host. That is, with respect to a request for writing data corresponding to one page (of 4 KB, for example) into an SSD, pages (such as 63 pages) other than the page of an overwrite request are read from a corresponding block (of 256 KB=64 pages) in the SSD, and the pages corresponding to one block are written back, on a per page basis. In the SSD, whenever an already written page is updated (written), the following operations are performed:

reading each page other than the page of an overwrite target from the SSD and transferring and writing the page into the DRAM or the like;

performing data merging on the DRAM or the like;

performing erasure on a per block basis on the SSD; and reading and transferring data from the DRAM or the like and writing data on a per page basis in the SSD. Thus, a processing time required for a write access will increase, so that random write performance will be remarkably reduced.

<Append Scheme: SSD>

In an append scheme (append write scheme), write target data are sequentially written in an ascending order of pages, for example, irrespective of a logical address specified by a write request from a host. When the write request (write request specifying, as a write destination address, a logical address specified before as a write destination address) is made from the host, the write target data is written into a new unwritten page in a block for which erasure has been performed, and a page corresponding to the logical address (page into which a write has been performed and which corresponds to the logical address) is made to be invalid (invalid). Then, the new page into which the write target data has newly been written is made to be valid (valid). The new page is then associated with the logical address specified by the write request.

The following describes an example of application of the append scheme to the above described SSD. When the number of pages that have been made to be invalid increases and the invalid pages are disposed at random in the append scheme, writable contiguous pages (storage regions) cannot be sufficiently secured (fragmentation). Thus, compaction (garbage-collection) or de-fragment is performed at an appropriate timing. In the compaction, valid data stored in a page (at a physical address) that is not made to be invalid is collected from a block including a page that has been made to be invalid, and is moved to a free block (unused block for which erasure has been performed) by copying, for example. Then, the original block is erased on a block basis, thereby generating a new free block. FIGS. 22A to 22D are explanatory diagrams explaining the compaction. In an example schematically illustrated in FIG. 22A, with respect to one block from a physical page address AA+0 to a physical page address AA+63 (in which each page=4KB), invalid (invalid) pages are 2 pages from an address AA+2, 4 pages from an address AA+6, 2 pages from an address AA+12, and so on. Pages storing valid (valid) data a, c, e are respective pages with addresses AA+0, AA+4, AA+10, and so on. As illustrated in FIG. 22B, the valid data a, c, and e of the pages with the addresses AA+0, AA+4, AA+10, and so on are sequentially copied to a free block (with a leading address BB+0). When a storage medium is the SSD, the block illustrated in FIG. 22A is correctively erased, on per a block basis, after the copying has been finished, thereby generating a free block illustrated in FIG. 22C (erasure is not necessary when the storage medium is an HDD, and the block in FIG. 22A is managed as a free block after the copying has been completed). Then, with respect to an address conversion table configured to map each logical address to a physical address, the following operations are performed, for example:

updating a physical address corresponding to a logical address LAa of the data a from the original address AA+0 to the address BB+0 of the new block;
updating a physical address corresponding to a logical address LAc of the data c from the original address AA+4 to an address BB+2; and
updating a physical address corresponding to a logical address LAe of the data e from the original address AA+10 to an address BB+4 (refer to FIG. 22D).

Though not limited thereto, a leading address (base address) for specifying an access by a logical address may be set to be located at a page boundary (page boundary is defined for each 4 KB when a page size is 4KB, for example), as with the physical address, for example.

<Append Scheme: HDD>

The above description has been mainly given about the append scheme when the SSD is employed as the storage medium (storage device). There is an LFS (Log-structured File System) described in Non Patent Literature 1, Non Patent Literature 2, and so on, for example, as an append-lonely logging scheme for an HDD or the like. In the LFS, speeding-up of a write access is implemented by sequentially and asynchronously accessing a disk. (Plural) file (Data) changes are collected into a file cache (write buffer), and these changes are packed together. Then, these changes are written into a disk by sequential transfers (sequentially written at a transfer speed close to a maximum band width of the disk, for example). To take an example, file system metadata such as modified file data, a directory block, an inode block (file system data structure in a UNIX (registered trademark) system: information on an object in a file system such as a file or a directory is stored) are packed together and are sequentially written into the disk. In the LFS, data is added to a file system in an add-only log form.

The append write scheme is focused on random write performance alone to achieve improvement of the performance. The HDD has random access performance lower than successive access performance. In a successive access, information is physically and sequentially accessed. The successive access is thus also referred to as a sequential access. A random access is characterized by not physically needing sequential access.

In the case wherein an address specified by a write request is fixed (e.g., a correspondence relationship between a physical address and a logical address in a storage medium is fixed), a low-speed random write occurs by a write to a non-contiguous storage region in the storage medium.

In the append write scheme, a storage destination address (such as a physical page address) of data to be stored in the storage medium is dynamically changed. When write data is written to a logical address specified by a write request, an address (such as a physical address) of a free region into which the write data has been written is associated with the logical address specified by the write request. Then, by successively storing write data in the free region, occurrence of a low-speed random write is reduced.

In the append write scheme, a random write that is disadvantageous in terms of performance of an HDD or the like can be replaced by a successive write that is advantageous in terms of performance. For this reason, as long as a region for an append can be secured on a storage medium, the append write scheme is not restricted by a capacity as in a cache, for example (wherein an effect of performance improvement is limited for a read or a write of data of a capacity exceeding a storage capacity of the cache).

The append write scheme aims at improvement of access performance by replacing a low-speed random write access by a successive write access to a contiguous free region of an append write destination, as mentioned above. That is, in the append write scheme, a random write access corresponding to a storage capacity secured for an append can be accommodated. However, in order to reduce the frequency of random write accesses (improve the access performance by increasing the number of sequential accesses), a large contiguous free region needs to be secured as an append write destination.

In the append write scheme, when data written to the storage medium such as the HDD is updated, update data is written to a new storage region (free region), without being overwritten to a storage region where the data (old data) to be updated is stored. The storage region having the old data before the update (data to be updated) stored therein is made to be invalid to become a storage region (unused region) for newly storing data. On the other hand, a storage region having un-updated data stored therein remains in a valid (valid) state. For this reason, when a data update follows, fragmentation (fragmentation) of the free region (unused region capable of storing the new data) occurs. The frequency of random writes due to the fragmentation of the free region (decrease in a contiguous free region) increases. As a result, storage access performance is reduced. Thus, elimination of fragmentation of the free region (de-fragment (de-fragment), garbage-collection (garbage-collection), or segment cleaning (segment-cleaning) in the LFS) is performed. As mentioned above, in the elimination of fragmentation (de-fragment) of the free region, a contiguous free region is increased after valid data stored in the storage medium has been read and moved to a different region of the storage medium by restoring (copying), for example. Since the de-fragment involves a read access and a write access to the storage medium, the access performance is reduced for a common access (data access to be performed on a system side and not related to the de-fragment). In order to avoid deterioration of the access performance for the common access, the de-fragment is performed in one of the following conditions, for example:

when no access to the storage medium is performed; or
in a low load state.

While write accesses are continuously performed to the storage, for example, the low load state does not occur. Assume that the de-fragment is performed while the write accesses are continuously performed. Then, write access performance is remarkably reduced. For this reason, while the write accesses are continuously performed, the de-fragment is not performed. However, by not performing the de-fragment, fragmentation of a free region will occur. Then, it becomes difficult to secure an adequate contiguous free region or the like. Data are to be stored in noncontiguous free regions. Consequently, access performance of the continuous write accesses will be remarkably reduced.

Patent Literature 1 discloses a method as a configuration for improving IOPS (IO/per second: the number of times of accesses that can be processed per second) performance when data is written, without performing garbage collection. The method comprises a step of writing first data from a host to pages in Block 3 of blocks 1 to 3 that constitute a recording medium; a step of writing to a buffer second data recorded in a page of Block 1 that has been selected based on a non-use page; a step of erasing data recorded in the page of Block 1; and a step of writing the second data to the page of Block 1. The non-use page indicates a page in which no data is written, or a page in which data written in a different page is written. This method allows reduction of the number of times of erasing the data recorded in the block without performing the garbage collection.

Patent Literature 2 (PTL 2) relates to a technology for allocating a free storage region of at least one storage apparatus to a virtual volume. Patent Literature 2 discloses a configuration for performing real region allocation in which fragmentation (fragmentation) is avoided and use efficiency of a storage region is improved. In this configuration, a virtualization switch extracts and allocates a storage region from a free storage region with respect to a request size specified by a management console until a remaining size becomes smaller than a specified region size upper limit value. Then, when the remaining size becomes smaller than the region size upper limit value, the virtualization switch extracts and allocates from the free storage region, a storage region of a minimum power-of-two size not smaller than the remaining size, for this remaining size. free storage region is constituted from a plurality of contiguous free regions, the virtualization switch selects a contiguous free region of a largest size as an allocation target. In this Patent Literature 2, a large contiguous free region is selected so that fragmentation occurs as little as possible.

PTL 1: JP Patent Kokai Publication No. JP2010-237907A
PTL 2: JP Patent Kokai Publication No. JP2004-164370A
NPL 1: Rosenblum, Mendeland, Ousterhout, John K. (Jun. 1990)-"The LFS Storage Manager", Proceedings of the 1990 Summer Usenix, pp 315-324.
NPL 2: Rosenblum, Mendeland, Ousterhout, John K. (Feb. 1992)-"The Design and Implementation of a Log-Structured File System", ACM Transactions on Computer Systems, Vol. 10 Issue 1, pp 26-52.

SUMMARY

The analysis of Analysis of the related arts will be given below.

In the append write scheme, a large contiguous free region is necessary as an append write destination. The de-fragment (garbage collection, compaction) is performed in order to eliminate fragmentation of a free region. However, the de-fragment process leads to deterioration of access performance.

It is difficult to eliminate fragmentation of a free region, by not using the de-fragment. For this reason, there is desired implementation of a scheme which allows write access performance to be maintained, by avoiding or reducing influence to be caused by the fragmentation of a free region (which is a finding of the inventor of this application).

The above-mentioned Patent Literature 1 does not include means for maintaining write access performance without being influenced by the fragmentation of a free region.

The above-mentioned Patent Literature 2 relates to a technology for avoiding the fragmentation of a free region itself. The above-mentioned Patent Literature 2 lacks recognition of the challenge of maintaining random write access performance without being influenced by the fragmentation, based on an assumption that the fragmentation of a free region will occur.

The present invention has been conceived to solve the above-mentioned problem. An object of the present invention is to provide an apparatus, a method, and a program configured to suppress access degradation of a storage caused by a processing load for dissolving fragmentation of a free region and to guarantee at least write access performance.

According to one of some aspects (aspect 1), there is provided a storage apparatus comprising:

at least one storage medium configured to store data;

an access reception section configured to receive at least a write access request, as an access request from a host to the storage medium;

a storage region securing section configured to manage collectively a predetermined preset number of contiguously arranged units of storage, as a group, each unit of storage having a predetermined capacity and corresponding to each one of a plurality of pieces into which a storage region of the storage medium is divided, the storage region securing section, when securing a storage region for storing write data specified by the write access request received, selecting one or more groups, the number of the units of storage in a free state included in each of the one or more groups satisfying a specified access performance set condition, wherein the storage region securing section, in selection of the group, sets, a group in which the units of storage in a free state are distributed non-contiguously, to one to be selected, as long as the group satisfies the access performance set condition;

an allocation section configure to associate an address specified by the write access request as a storage destination of the write data and an address on the storage medium allocated to at least one unit of storage in a free state included in the group selected; and an access execution section configured to sequentially write the write data to the unit of storage in a free state included in the group selected by the storage region securing section, with the address association performed by the allocation section.

According to another one of the aspects (aspect 2), there is provided an access control method for a storage comprising:

managing collectively a predetermined preset number of contiguously arranged units of storage, as a group, each unit of storage having a predetermined capacity and corresponding to each one of a plurality of pieces into which a storage region of a storage medium is divided, when securing a storage region for storing write data in response to a write access request to the storage medium received from a host, selecting one or more groups, the number of the units of storage in a free state included in each of the one or more groups satisfying a specified access performance set condition, in selection of the group, setting, a group in which the units of storage in a free state are distributed non-contiguously, to one to be selected, as long as the group satisfies the access performance set condition;

associating an address specified by the write access request as a storage destination of the write data and an address on the storage medium allocated to at least one unit of storage in a free state included in the group selected; and sequentially writing the write data to the units of storage in a free state included in the group selected with association of the address performed.

According to further another one of the aspects (aspect 3), there is provided a program to cause a computer comprising a storage apparatus to execute:

an access reception process that receives at least a write access request, as an access request from a host to at least a storage medium configured to store data;

a storage region securing process that manages collectively a predetermined preset number of units of storage included in contiguous storage regions, each unit of storage having a predetermined capacity and corresponding to each one of being each of a plurality of pieces into which a storage region of the storage medium is divided, the storage region securing process, when securing a storage region for storing write data in response to the write access request received, selecting one or more groups, the number of the units of storage in a free state included in each of the one or more groups satisfying a specified access performance set condition, wherein the storage region securing process, in selection of the group, sets, a group in which the units of storage in a free state are distributed non-contiguously, to one to be selected, as long as the group satisfies the access performance set condition;

an allocation process that associates an address specified by the write access request as a storage destination of the write data and an address on the storage medium allocated to at least one unit of storage in a free state included in the group selected; and an access execution process that sequentially writes the write data to the unit of storage in a free state included in the group selected by the storage region securing process and with the address association performed by the allocation process.

According to the present invention, there is provided a computer-readable recording medium recording the program, such as a semiconductor memory or a magnetic/optical disk.

According to the present invention, deterioration of access performance of a storage caused by a processing load for dissolving fragmentation of a free region can be suppressed and at least write access performance can be guaranteed. Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 3 is a table schematically illustrating an example of an access request table in the exemplary embodiment of the present invention.

FIG. 4 is a table schematically illustrating an example of an address conversion table in the exemplary embodiment of the present invention.

FIG. 5 is a table schematically illustrating an example of a command table in the exemplary embodiment of the present invention.

FIG. 6 is a table schematically illustrating an example of a page group table in the exemplary embodiment of the present invention.

FIG. 7 is a table schematically illustrating an example of a performance requirement table in the exemplary embodiment of the present invention.

FIG. 11 is a table schematically illustrating an example of an access request table in a first example of the present invention.

FIG. 12 is a table schematically illustrating an example of an address conversion table in the first example of the present invention.

FIG. 13 is a table schematically illustrating an example of a command table in the first example of the present invention.

FIG. 14 is a table schematically illustrating an example of a page group table in the first example of the present invention.

FIG. 15 is a table schematically illustrating an example of a performance requirement table in the first example of the present invention.

FIG. 16 is a table schematically illustrating an example of an access request table in a second example of the present invention.

FIG. 17 is a table schematically illustrating an example of an address conversion table in the second example of the present invention.

FIG. 18 is a table schematically illustrating an example of a command table in the second example of the present invention.

FIG. 19 is a table schematically illustrating an example of a page group table in the second example of the present invention.

FIG. 20 is a table schematically illustrating an example of a performance requirement table in the second example of the present invention.

FIGS. 22A-22D are schematic diagrams for schematically explaining an example of compaction (garbage collection) in an append-type storage.

DETAILED DESCRIPTION

Figure 21:
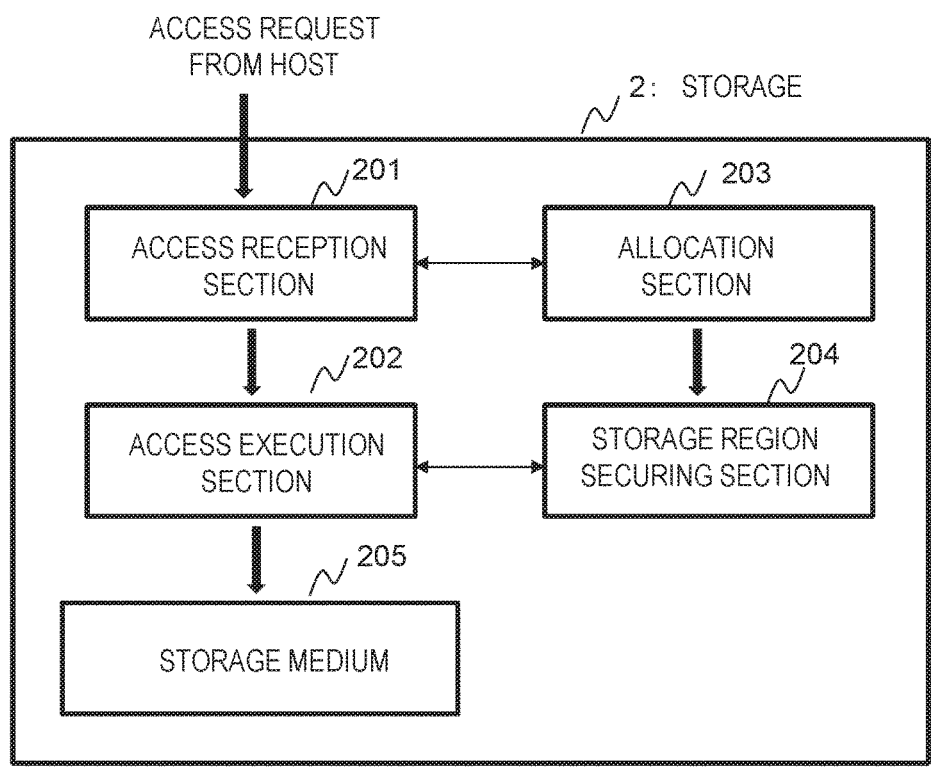
FIG. 21 is a schematic diagram for explaining a basic configuration of the present invention.

Preferred modes of the present invention will be described. Referring to FIG. 21, a storage apparatus according to modes of the present invention includes at least one storage medium (205) configured to store data, an access reception section (201) configured to receive an access request from a host to the storage medium, and a storage region securing section (204) configured to manage collectively, as a group, a predetermined preset number of units of storage (predetermined number of pages, for example) contiguous arranged, each unit of storage (page) being each one of a plurality of pieces into which a storage region of the storage medium is divided (each having a predetermined storage capacity). The storage region securing section (204) selects one or more groups, the number of the units of storage in a free state in each of the one or more groups satisfying a specified access performance set condition, when securing a storage region for storing data to be written specified by the write access request from the host. Preferably, the storage region securing section (204), in selecting the group, sets an also group in which the units of storage in a free state are not distributed contiguously (adjacent) and non-contiguously (e.g., sporadically distributed), as a group to be selected, as long as the group satisfies performance set condition.

The storage apparatus in a preferred mode further includes an allocation section configured to associate an address (access address that is referenced on a side of the host: logical address) specified by the write access request as a storage destination of the write data and an address (physical address) on the storage medium allocated to at least one of the units of storage in the free state included in the selected group (e.g., a unit of storage in a free state disposed at a forefront in the group), and an access execution section (202) configured to sequentially write the write data to the at least one of the units of storage in the free state included in the group selected by the storage region securing section (204) and with address mapping (mapping between the logical address and the physical address) thereof performed by the allocation section (203).

In preferred modes of the present invention, with respect to the group used for management on per a group basis, the storage region securing section (204) also sets the group in which the distribution of the units of storage in a free state is noncontiguous as a target of the management.

Figure 2:
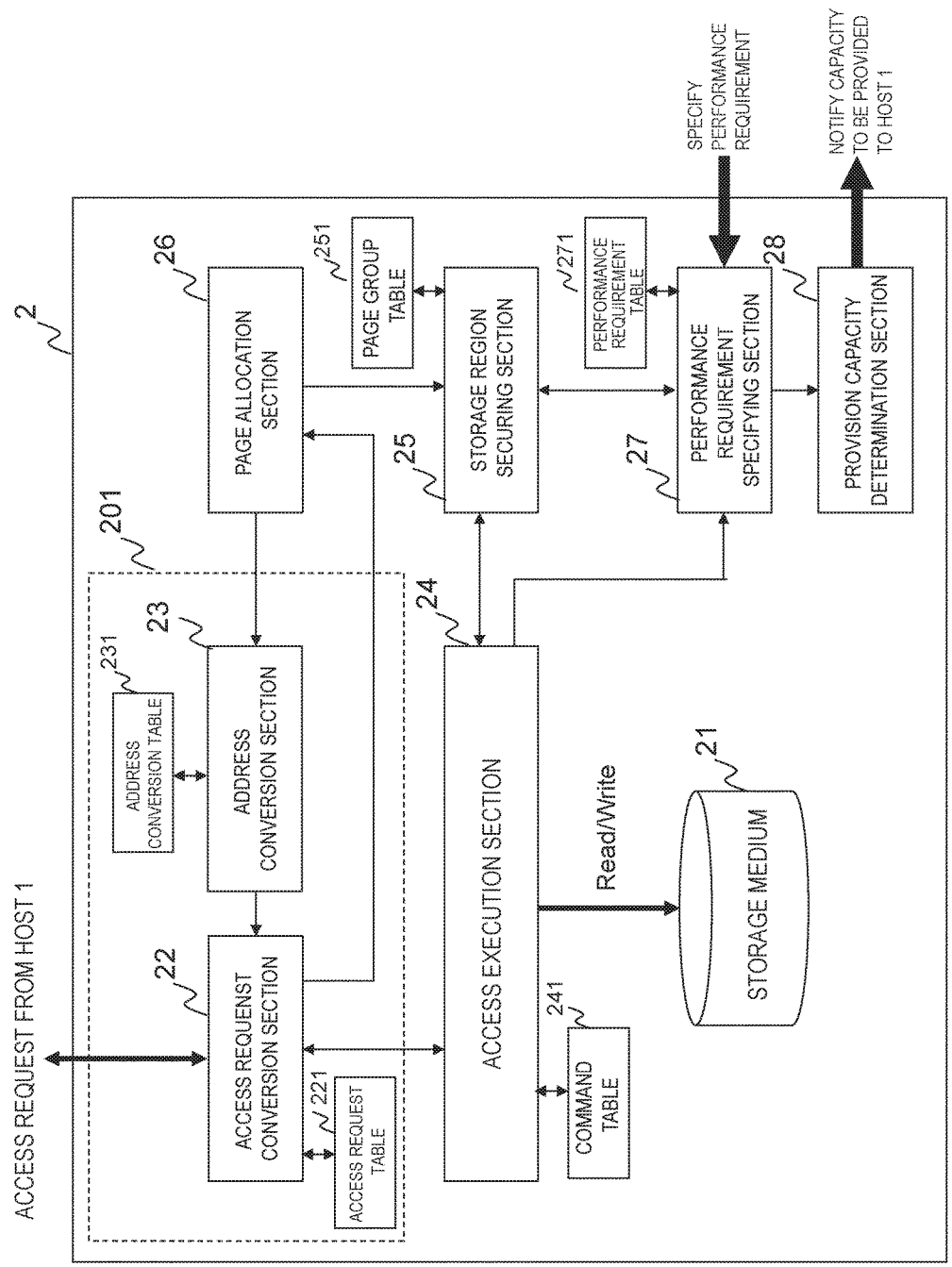
FIG. 2 is a diagram illustrating an example of a configuration of a storage in the exemplary embodiment of the present invention.

Referring to FIG. 2, the storage apparatus in some preferred modes of the present invention includes a provision capacity determination section (28) configured to variably set a storage capacity that may be provided by the storage medium to a value of a capacity that may ensure at least one of the groups including the units of storage in the free state, the number of which is greater than or equal to the number that satisfies the access performance set condition, and to notify, to the host, the capacity value that has been set and may be provided by the storage medium.

In preferred modes of the present invention, referring to FIG. 2, the access reception section (201) includes an address conversion section (23) configured to mutually convert the address (logical address) specified by the access request from the host and the address (physical address: physical page address) allocated to one of the storage regions on the storage medium, and an access request conversion section (22) configured to convert the access request from the host to the storage medium into an access command to the storage medium using the address allocated to the storage region on the storage medium.

In preferred modes of the present invention, referring to FIG. 2, the storage apparatus comprises a performance requirement specifying section (27) configured to specify, as the condition regarding access performance, at least a lower limit of the access performance. Alternatively, the performance requirement specifying section (27) may specify a lower limit of an unused region rate of the storage medium, as the condition regarding the access performance.

In preferred modes of the present invention, referring to FIG. 2, the access reception section (201) includes an access request conversion section (22) configured to receive the access request from the host, convert the access request into an access command on a per unit of storage basis (e.g., on a per page basis) in an address space, and instruct the access execution section (24) to execute the command, and an address conversion section (23) including an address conversion table that records a correspondence relationship between a logical address to be used when the host accesses the storage apparatus and a physical address indicating one of the storage regions on the storage medium (21) corresponding to the logical address. A single or a plurality of sectors with contiguous physical addresses on the storage medium such as an HDD may be defined as a page.

The address conversion section (23) converts a logical address into a physical address when the access request conversion section (22) converts the access request from the host into the access command to the storage medium, and updates the address conversion table upon receipt of a request from the allocation section (26) for changing the physical address indicating the storage region on the storage medium corresponding to the logical address following the storage of write-data.

The access execution section (24) issues to the storage medium (21) an access command obtained by conversion of the access request from the host by the access request conversion section (22). The storage region securing section (25) includes a table (251) configured to manage an allocation status of each unit of storage (page) in each of the groups constituted from a plurality of the contiguous storage regions, and determines the physical address to be used as the storage region of the unit of storage in the storage medium and to be allocated to the logical address by the allocation section (26).

The allocation section (26) allocates, to the logical address, the unit of storage in the storage medium to be used for storing the write data, in response to a request from the access request conversion section (22).

The performance requirement specifying section (27) holds in a storage section a lower limit and an upper limit of performance or a lower limit of an unused region rate specified for the storage apparatus (2) and to be maintained for a write access.

The provision capacity determination section (28) calculates the capacity that may be provided to the host by the storage apparatus in a performance requirement satisfying range, based on a performance lower limit and a performance upper limit for a write access to the storage apparatus, specified by the performance requirement specifying section (27), a capacity of the storage medium, and access performance.

In preferred modes of the present invention, the storage region securing section (25) determines the number of units of storage in the free state included in the group of the units of storage from a number for causing write access performance to fall within a range defined by the lower limit and the upper limit of the access performance.

When there is not a group including the number of units of storage in a free state for securing the lower limit (at least the lower limit) of the access performance of a write access, the storage region securing section (25) calculates a lower limit value of the access performance that may be maintained by the storage apparatus based on the number of the units of storage in the free state in the group of the units of storage in the storage medium and performance of the at least one storage medium.

The storage region securing section (25) may notify the lower limit value of the access performance to the performance requirement specifying section (27), and the performance requirement specifying section (27) may change a set value of the lower limit of the access performance.

In preferred modes of the present invention, the storage medium (21) may include a hard disk drive (HDD), and may set a total storage capacity of the predetermined number of the units of storage in the storage regions that are contiguous and included in a same one of the groups to a storage capacity corresponding to one track of the hard disk drive (HDD) or a capacity value calculated based on the storage capacity. The number of sectors (in which each sector (one block) has 512 Bytes, for example) in a track in an inner peripheral portion of the HDD is smaller than the number of sectors in a track in an outer peripheral portion of the HDD. A minimum (or mean) storage capacity, for example, may be set to a total capacity of the group of the units of storage (also referred to as a "page group") (the number of the units of storage=capacity of the group of the units of storage/ capacity of each unit of storage).

An application example of the present invention to an append write type storage will be described.

Write (Write) data from a host is append written to a free region of the storage.

A unit of storage group that includes units of storage (pages) in contiguous storage regions and may include a non-contiguous unit of storage, in which a rate of an unused region (free page(s)) in a storage space is not less than a predetermined value set in advance, is selected and secured. Then, the write data (update data) is sequentially (sequentially) append written to one or more of the units of storage in a free state in the unit of storage group in the order of addresses thereof (the order of physical addresses thereof) (sequentially written to the one or more of the units of storage in the free state irrespective of a logical address specified by a write request from a host side). With this arrangement, in the storage using a storage medium having lower random access performance than sequential access performance, predetermined random access performance is guaranteed.

A storage region to be provided by the storage medium constituting the storage is divided into units of storage each having a predetermined capacity set in advance (hereinafter referred to as "pages"). Each of the pages is set to a unit for read/write access to the storage medium. A physical storage region of the storage medium of the storage is allocated to an address space (logical address space) of the storage region of the storage, on a per page basis (physical page).

The physical page of the storage medium to be allocated to the address space (logical address space) of the storage changes for each write access. That is, a correspondence between a logical address and the address of the physical page is dynamically changed. The total number of the physical pages in the storage, for example, is set to be larger than the total number of pages in the logical address space (a quotient (integer value) obtained by division of the logical address space by a page size).

According to the present invention, in a write access, a page whose address (page address) on the storage medium is not necessarily contiguous may be allocated as a storage region (page) of the write data, which is different from a usual append write scheme.

By allowing allocation of the non-contiguous page in an append write in this manner, the need for a de-fragment process due to free page scattering (fragmentation) is eliminated.

On the other hand, when a write access (non-successive write access) is performed to a non-contiguous page in a storage medium such as an HDD, access performance is reduced more than in the case of a write access (successive write access) to a contiguous page.

Then, by limiting the page in a storage medium to be allocated as the storage destination of the write data within a predetermined (certain) address range set in advance and selecting the page (selecting a page group constituted from a plurality of the pages with contiguous addresses) in the present invention, an extent of deterioration of access performance to be caused by a random write (a write access to the non-contiguous page) to the storage medium is reduced (deterioration of the access performance is reduced).

As is well known, in a common HDD, storage regions referred to as "tracks" are concentrically stored in a disk that continues to rotate inside the HDD. Finer storage regions referred to as "sectors" are sequentially stored on each track. In the HDD, after a magnetic head has been moved (positioned) immediately above a sector on the disk to be accessed and corresponding to a leading address, a read access or a write access is performed. As is well known, an access to target data on the HDD is sequentially performed as follows:

- an access arm is moved to transfer the magnetic head to the track where the target data is stored (this operation is referred to as a "seek");
- after completion of track positioning, rotation of the disk is waited for until a target sector appears for the magnetic head (this operation is referred to as a "rotation wait"); and
- Read/Write data transfer is performed.

Further, as is well known, much of a period of time required for a random access to the HDD is taken by two types of operations of the seek and the rotation wait. By reducing the period of time required for the operations of the seek and the rotation wait, a random access time can be reduced.

Further, as is well known, in the common HDD, adjacent tracks, on which data in contiguous storage regions in an address space are stored, are sequentially associated in the address space. In an exemplary embodiment, a unit (unit of storage) for managing a storage region on the HDD is provided. In this specification, a single or a plurality of sectors with contiguous physical addresses on the HDD are defined as a page, and this page is set to the unit of storage (though no particular limitation is imposed, the size of one page (page size) may be set to 4 Kbyte=8 sectors, for example, when a sector size is 512 bytes).

Pages with closer addresses are present on the tracks that are close to each other. For this reason, when access is performed to the pages of access targets that are non-contiguous (access to the pages that are not adjacent to each other), the closer the addresses to be accessed are, the more a seek time is reduced.

As is well known, when two non-contiguous sectors to be sequentially accessed are present on a same track and the access is performed, no seek occurs and much of an access time becomes a rotation wait time.

Further, as is well known, data is sequentially stored in a rotation direction of each track. For this reason, the closer addresses pages of a same track have, the smaller a rotation wait time is.

It is noted from the above description that by limiting the address range of the page that will become the storage destination of write data, an increase in an access time due to random write access is reduced, and an extent of reduction in access performance in the random write access is reduced more than in the case of a successive write access.

An effect of reduction of the access time in the random write access to be obtained by limiting the address range of the page that will become the storage destination of the write data is proportional to the number of the pages that are present in the limited address range and can store the write data. The larger the number of the pages that are present in the limited address range and can store the write data, the larger the effect of reduction of the access time in the random write address is.

It is necessary to constantly obtain the effect of reduction of the access time in order to guarantee certain access performance in the random write access. Then, according to the present invention, the page to be used as the storage destination of the write data is selected from a region (page group) on the storage medium where not less than a predetermined number (certain number) of free pages set in advance are present. With this arrangement, predetermined random write access performance is maintained.

In addition to performance of a storage medium (such as a data transfer rate), access performance (write access performance) to the storage medium depends on the followings:

- the number of physical pages (storage capacity) of the storage medium;
- the number of pages to be allocated to a storage address space (logical address space) for the storage medium; and so on.

Assuming that a half of a storage capacity of the storage medium is allocated to the storage address space, for example. Then, a half of the total number of physical pages in the storage medium becomes pages that can be allocated as storage destinations of write data. It means, in this case, that when a certain address range is specified for a write access, a half or more of the pages in the address range are constantly present in the storage medium as free pages for the storage destinations of the write data.

When an address interval between pages to be accessed is relatively small in a storage medium such as an HDD having lower random access performance (performance of access to addresses of pages to be accessed that are non-contiguous) than successive access performance (performance of access to addresses of pages to be accessed that are contiguous), an access time for each page may be substantially equivalent to an access time when access is performed to contiguous storage regions including the page.

When write accesses are performed to a plurality of pages on a same track in an HDD in the order of addresses thereof, an access time for each page does not include a seek time, and is the sum of a rotation wait time and a data transfer time.

When accesses are successively performed to data on a same track, a period of time required for the accesses is equal to a period of time of rotation of a magnetic head from a sector at which the accesses have been started to a sector at which the accesses have been finished. That is, even if the page of a storage location of write data is not contiguous, the accesses can be performed in an access time that is substantially equivalent to an access time when write accesses are performed to contiguous pages, provided that an interval of addresses (physical page addresses) between the accesses (such as the access at a current time and the access at a subsequent time) is small.

Accordingly, in an example where the half of the capacity of the storage medium is allocated to the storage address space, with respect to a write access to a non-contiguous page included in a predetermined (certain) address range set in advance, performance, which is a half of performance obtained when write accesses have been performed to contiguous pages, may be able to be maintained in the predetermined address range.

According to the present invention, with the above-mentioned arrangement, maintenance of random access performance can be implemented for a write using an append write scheme, even under a situation where a de-fragment process is not performed.

According to a preferred mode of a storage of the present invention, the storage includes:

a storage medium configured to store data;

a device (unit: function) configured to convert an access request to the storage into an access to the storage medium for each predetermined size (page);

a device (unit: function) configured to mutually convert a storage address space (logical address space) and an address (physical page address) for each page in the storage medium;

a device (unit: function) configured to execute an access process for the storage medium on a per page basis;

a device (unit: function) configured to determine a physical region of one or more of the pages in the storage medium as a storage destination of write data;

a device (unit: function) configured to allocate the one or more of the pages from the physical region in the storage medium with respect to the storage address space;

a device (unit: function) configured to specify a performance upper limit and a performance lower limit with respect to a write access to the storage; and a device (unit: function) configured to determine a capacity that can be provided by the storage.

Specifically, an HDD, for example, is employed as the storage medium configured to store data (whole data) of the storage. In some modes, the storage medium is constituted from a single storage medium or a plurality of storage media.

The device (access request conversion section) configured to convert the access request to the storage into the access to the storage medium for each page divides each of a read access request and a write access request from a host or the like outside the storage medium into an access for each page, based on an access destination address and an access length (data size).

The process of the access request is completed when read access(es) or write access(es) for the respective pages after the division are all completed.

The function (address conversion section) configured to mutually convert the storage address space and the address for each page in the storage medium records a correspondence relationship between an address (logical address) to be used when data is read or written from outside the storage and the address (physical address) for accessing the data stored in the storage medium of the storage, and mutually converts the addresses. The correspondence relationship between the addresses is updated whenever the physical address (page) on the storage medium is allocated to the logical address space by the page allocation function (page allocation section).

The device (unit: function) (access execution section) configured to execute the access process for the storage medium for each page executes, for the storage medium, the access process for each page obtained by the division by the access request conversion function (access request conversion section).

The function (unit or device) configured to determine the physical region of one or more of the pages in the storage medium as the storage destination of write data monitors a use status of the pages in the storage medium, and discovers a region (defined as a "page group" or a "PG") constituted from a certain number (a predetermined number set in advance) of the pages that are contiguous. In this region, a distribution of the pages (free pages) that are not allocated to the storage address space can satisfy the performance upper limit and the performance lower limit with respect to the write access specified by the performance requirement specifying function (performance requirement specifying section). The unit (function) configured to allocate the page secures the discovered region as the physical region on the storage medium to be allocated to the address space.

The unit (page allocation section) configured to allocate the one or more of the pages from the physical region on the storage medium to the storage address space allocates the one or more of the pages in the storage medium included in the page group (PG) secured by the storage region securing function to the logical address(es) where the data is to be stored, in response to a write request to the storage.

The page allocation section (function) sequentially allocates one or more of the free pages in the page group (PG) to the logical address space. When a free page shortage occurs, the page allocation section (function) requests the storage region securing function to secure a page group (PG) including the physical page(s) to be allocated.

The device (unit: function) (performance requirement specifying section) configured to specify the performance upper limit and the performance lower limit with respect to the write access to the storage specifies, for the storage, the performance lower limit (minimum performance) and the performance upper limit (maximum performance) with respect to the write access.

When the performance is specified, the performance lower limit or the performance upper limit is changed based on a constraint from inside the storage as well as by an instruction from outside the storage. The performance requirement specifying function also responds to an inquiry about the performance upper limit and the performance lower limit with respect to the write access The unit (provision capacity determination section) configured to determine the capacity that can be provided by the storage calculates the capacity that can be provided to an outside by the storage in a condition-satisfying range, based on the performance lower limit and the performance upper limit with respect to the write access to the storage specified by the performance requirement specifying section and the capacity and access performance of the storage medium.

<Comparison with Patent Literature 1>

In the above-mentioned Patent Literature 1, in a storage medium constituted from a flash memory, a write request is divided into certain access units for the flash memory, and an append write is performed so that a write is successively performed to a single block that is an erasure unit of the flash memory. A block including a large number of free regions is selected as the destination of the write. The storage in Patent Literature 1 includes a function of updating a correspondence relationship between a physical address of the flash memory and a logical address of the storage so that write data may be append written whenever a write occurs.

Patent Literature 1 has a function corresponding to one exemplary embodiment with respect to the access request conversion function, the address conversion function, the access execution function, and the page allocation function. In Patent Literature 1, when a block of an append write destination is determined, a free region amount in each block of the flash memory is managed, and the block having the largest number of free regions is selected as the append write destination.

The storage region securing function of the present invention selects a physical region of the storage medium that satisfies the performance upper limit and the performance lower limit with respect to a write access, as an append write destination.

Patent Literature 1 does not disclose a configuration including a function of maintaining a performance lower limit and a performance upper limit set for a write. Further, Patent Literature 1 does not disclose a configuration including a performance requirement specifying function needed for performing control of maintaining the performance upper limit and the performance lower limit specified with respect to a write access to the storage and a provision capacity determination function related to maintenance of write access performance.

Compared with the comparative example (an example where the present invention is not applied), the present invention eliminates the need for the de-fragment process needed for the append write scheme in a random write access to be successively performed to the storage, while improving access performance. As a result, implementation of maintenance of the performance lower limit and maximum performance set in advance is made possible.

<Exemplary Embodiment>

Figure 1:
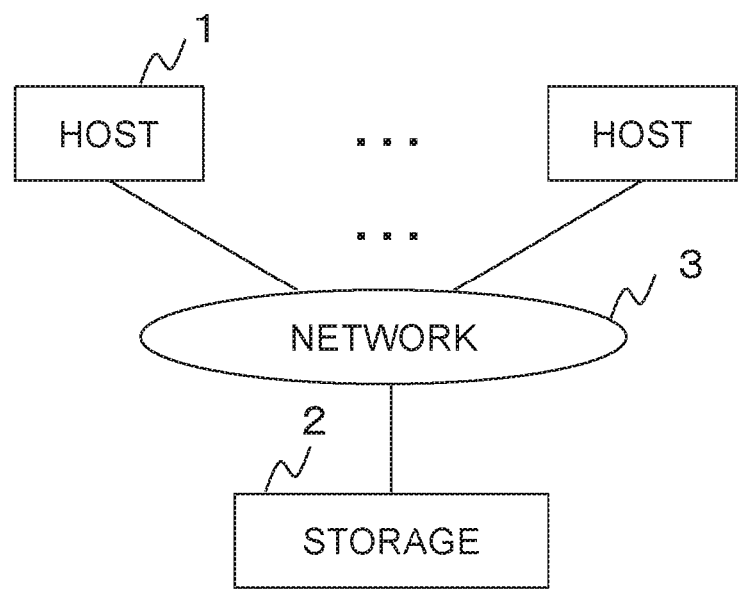
FIG. 1 is a diagram illustrating an example of an overall system configuration in an exemplary embodiment of the present invention.

Now, the present invention will be described with respect to a system configuration according to an exemplary embodiment and with reference to the drawings. FIG. 1 is a diagram illustrating the configuration in a first exemplary embodiment. Referring to FIG. 1, the overall configuration of a system in this first exemplary embodiment includes one or more hosts 1 configured to access data, a storage 2 constituted from one or more storage media, and a network 3 configured to connect the host(s) 1 and the storage 2.

The network 3 may have not only a configuration that allows a plurality of the hosts 1 to be connected to the storage 2, but also such a configuration that the host(s) 1 are directly connected to the storage 2. The storage 2 may be constituted from a plurality of devices connected via the network 3, or a system. Subsequently, a configuration of the storage 2 will be described with reference to FIGS. 2, 3, 4, 5, 6, and 7.

FIG. 2 is a diagram illustrating the configuration of the storage 2 in FIG. 1. Referring to FIG. 2, the storage 2 includes a storage medium 21, an access request conversion section 22, an address conversion section 23, an access execution section 24, a storage region securing section 25, a page allocation section 26, a performance requirement specifying section 27, a provision capacity determination section 28, an access request table 221, an address conversion table 231, a command table 241, a page group table 251, and a performance requirement table 271. The access request table 221, the address conversion table 231, the command table 241, the page group table 251, and the performance requirement table 271 may be respectively provided in the access request conversion section 22, the address conversion section 23, the access execution section 24, the storage region securing section 25, and the performance requirement specifying section 27, or may be respectively provided in different storage regions in one storage section. The access request conversion section 22, the address conversion section 23, the access request table 221, and the address conversion table 231 in FIG. 2 constitute an access reception section 201 in FIG. 21. The access execution section 24, the storage region securing section 25, and the page allocation section 26 respectively correspond to an access execution section 202, a storage region securing section 204, and an allocation section 203 in FIG. 21.

The storage medium 21 stores data in an overall storage region of the storage 2, and is constituted from a single or a plurality of storage media like HDDs.

The access request conversion section 22 receives an access request from the host 1, converts the access request into one or more access commands for each page in an address space, and instructs the access execution section 24 to execute the one or more commands.

The access request conversion section 22 has the access request table 221 for managing a correspondence relationship between the converted access request and command(s).

When execution of a command by the access execution section 24 is completed, the access request conversion section 22 records completion of execution of the command in the access request table 221.

When an access command that has been completed is a read, the access request conversion section 22 receives data read from the storage medium 21.

When execution of all of the access commands corresponding to the access request is completed, the access request conversion section 22 returns the data read from the storage medium 21 to the host in the case wherein the access request is a read request, while the access request conversion section 22 notifies the completion to the host 1 in the case wherein the access request is a write request.

The access request conversion section 22, when generating, based on the access request by the host 1, a write access command to the storage medium 21, requests the page allocation section 26 to allocate a new storage region as a storage destination of write data specified by a write command.

FIG. 3 schematically illustrates one type of the access request table 221 in the exemplary embodiment. The access request table 221 records a correspondence relationship between each access request from the host 1 managed by the access request conversion section 22 and an access command to the storage medium 21 for each page.

In the example illustrated in FIG. 3, for each access request from the host 1, the access request table 221 records:
  an ID for each access request;
  a type of the access request (Read/Write)
  a leading address of an access destination;
  an access length (size of data (data length));
  one of the hosts (request source host) that has requested the access; and
  an ID indicating the access command to the storage medium 21 after conversion by the access request conversion section 22 (corresponding command ID).

The ID for each access request is given in order to mange each access request inside the access request conversion section 22. When the access request from the host 1 is managed without using the ID for each access request, this ID is not necessary. When the storage medium 21 is constituted from the single storage medium, an ID indicating the storage medium 21 for each entry is not necessary.

When processes of all of the one or more access commands to the storage medium 21 corresponding to the access request from the host 1 are completed, an entry corresponding to the access request is erased from the access request table 221.

Referring again to FIG. 2, the address conversion section 23 includes the address conversion table 231 that records a correspondence relationship between:
  a logical address to be used for accessing the storage 2 by the host 1; and
  a physical address (such as a physical page address) indicating a storage region on the storage medium 21 corresponding to the logical address.

The address conversion section 23 refers to the address conversion table 231 to perform conversion from the logical address to the physical address when the access request from the host 1 is converted into the access command to the storage medium 21 by the access request conversion section 22.

The address conversion section 23 updates the address conversion table 231 upon receipt of a request from the page allocation section 26 for changing the physical address indicating the region on the storage medium 21 corresponding to the logical address due to storage of write data.

FIG. 4 schematically illustrates one type of the address conversion table 231 in FIG. 2. The address conversion table 231 has an entry for each page in a logical address space, and records:

- a logical address indicating the page;
- an ID indicating the storage medium 21 for storing data of the page; and
- a physical address indicating a storage region of the data in the storage medium represented by the ID.

In the case wherein each entry in the address conversion table 231 is stored in an address order with regard to a page in the logical address, the logical address indicating each page for each entry is not necessary. In the case wherein each entry in the address table 231 is stored in an address order with regard to a page in the physical address, the physical address for entry is not necessary. When the storage medium 21 is constituted from the single storage medium, the ID indicating the storage medium 21 for each entry is not necessary.

Referring again to FIG. 2, the access execution section 24 receives each access command that has been converted by the access request conversion section 22 from the access request made by the host 1, and issues the access command to the storage medium 21.

The access execution section 24 includes the command table 241 configured to manage information on each access command. When the access command to the storage medium 21 is completed, the access execution section 24 returns a result of the command to the access request conversion section 22.

The access execution section 24 notifies to the storage region securing section 25 the page that has been allocated by newly writing therein the data in the storage medium 21 as a result of execution of the write command to the storage medium 21 and the page that has newly become usable as a result of update of data by a write.

The access execution section 24 refers to a write access performance upper limit specified by the performance requirement specifying section 27. When write access performance exceeds the performance upper limit, the access execution section 24 performs control of delaying execution of the write command.

FIG. 5 is a table schematically illustrating one type of the command table 241. The access execution section 24 manages each access command to the storage medium 21 received from the access request conversion section 22, using the command table 241. The command table 241 has an entry for each access command, and each entry records:

- an ID indicating the command;
- a type of the command (Read or Write);
- a storage medium ID of an access destination;
- an access destination address; and
- an ID for the access request corresponding to the command, which is managed by the access request table 221.

When each entry in the command table 241 is stored in the order of the ID for the command, the ID for each entry is not necessary. When the storage medium 21 is constituted from the single storage medium, the storage medium ID indicating the storage medium 21 for each entry is not necessary.

Referring to FIG. 2, the storage region securing section 25 determines the physical address of the page in the storage medium 21 to be allocated by the page allocation section 26 for the logical address and to be actually used as the storage region. The storage region securing section 25 has the page group table 251 configured to manage an allocation status of each page in the storage medium 21.

The page group table 251 manages a page allocation status of each page group (PG) constituted from a plurality of the pages that are contiguous.

The storage region securing section 25 refers to a performance upper limit value and a performance lower limit value with respect to each write access specified by the performance requirement specifying section 27, and determines and secures the page group (PG) to be used as a storage region in order to satisfy the performance values.

With respect to a performance lower limit for the write access specified by the performance requirement specifying section 27, when it is difficult to satisfy the performance lower limit, the storage region securing section 25 notifies difficulty of satisfying the performance lower limit to the performance requirement specifying section 27, based on a relationship between:

- access performance of the storage medium 21; and
- the number of pages in the page group (PG) that are free.

FIG. 6 is a table schematically illustrating one form of the page group table 251. The storage region securing section 25 manages the allocation status of each page in the storage medium 21, using the page group table 241.

Referring to FIG. 6, the page group table 251 has an entry for each page group (PG), and each entry records:

- a storage medium ID indicating the storage medium 21 in which the page group (PG) is present
- a leading address (leading address of the plurality of the contiguous pages) of the page group (PG) in the storage medium 21; and
- allocation information indicating the allocation status of each page in the page group (PG).

When the storage medium 21 is constituted from the single storage medium, the ID indicating the storage medium 21 for each entry is not necessary. Further, when each entry in the page group table 251 is stored in the order of the address, the address indicating the storage location of each entry is not necessary.

In the example illustrated in FIG. 6, the allocation information of each entry in the page group table 251 is represented by a bitmap. Respective bits of the bitmap starting from a starting bit of the bitmap sequentially indicate whether or not each page included in each page group (PG) is allocated to the logical address. That is, the size of the bitmap is equal to the number of the pages included in the page group (PG). The bitmap represents the bit corresponding to the page allocated to the logical address as 1, and represents the bit not allocated to the logical address as 0. Conversely, it may be so arranged that the bitmap represents the bit corresponding to the page allocated to the logical address as 0, and represents the bit not allocated to the logical address as 1. The allocation information may be represented by a different data format that can represent presence or absence of logical address allocation with respect to each page included in each page group (PG), rather than the bitmap illustrated in FIG. 6.

The following describes a process of the storage region securing section 25 in FIG. 2 for determining a page group (PG) capable of being used as a storage region based on the performance upper limit (upper limit) and the performance lower limit (lower limit) with respect to each write access specified by the performance requirement specifying section 27.

Each page group (PG) is constituted from a plurality of the contiguous pages. The number of the pages included in the page group (PG) is set to the number of pages such that a random write to each page in the page group (PG) can be processed in an access time equivalent to an access time required for successive writes to the storage medium 21.

Assume that an HDD is set to the storage medium 21 and a total capacity of the pages included in each page group (PG) corresponds to approximately one track of the HDD, for example. Then, no head seek will occur in the HDD. The number of sectors (blocks) is smaller in a track in an inner peripheral portion of the HDD and is larger in a track in an outer peripheral portion of the HDD. A storage capacity of the track in the inner peripheral portion of the HDD or a mean storage capacity of the tracks in the inner and outer peripheral portions, for example, may be set to the total storage capacity of the page group.

When the total capacity of the pages included in the page group (PG) corresponds to approximately one track of the HDD, the access time required for the random write to the page in the page group (PG) (access to the page with a noncontiguous address) is equivalent to a total access time required when the successive writes are performed to the pages in the page group (PG).

That is, assume that the following settings are made:
the number of pages included in each page group (PG) is set to N;
the number of pages which are not allocated to the logical addresses and in which write data can be newly stored is set to n in the page group (PG) to which the write data is to be stored;
a throughput when the successive writes are performed to the storage medium 21 is set to A per second; and
the capacity of each page is set to C.

Then, a write access throughput when writes are sequentially performed to the pages (free pages) in the page group (PG) not allocated to the logical addresses is given by the following Expression (1):

$$A \times n/N \qquad (1)$$

The capacity of new data that can be stored in the entirety of the page group (PG) is given by the following Expression (2):

$$C \times n \qquad (2)$$

A period of time required for completion of the writes to all the free page(s) in the page group (PG) is given by the following Expression (3):

$$N \times C/A \qquad (3)$$

When the writes are performed to all the free page(s) in the page group (PG) and then the page group (PG) to which the write data is to be stored is changed, the random write access to the storage medium 21 is performed.

When a mean access time required for the random access to the storage medium 21 is set to t, the number of the page groups (PGs) that are writable per second is given by the following Expression (4):

$$1/(t+N \times C/A) \qquad (4)$$

Based on the above Expressions (2) and (4), random write access performance in this exemplary embodiment can be estimated by the following Expression (5):

$$(C \times n) \times (1/(t+N \times C/A)) = (C \times n)/(t+N \times C/A)) \qquad (5)$$

The storage region securing section 25 determines the number n of free pages in each page group (G) which is required so that the write access performance obtained by the estimation means falls within a range defined by the write access performance lower limit and the write access performance upper limit specified by the performance requirement specifying section 27.

The storage region securing section 25 selects and secures the page group (PG) to be used as a storage region for the write data from arbitrary one(s) of the page group(s) (PGs) that satisfy the determined number n of the free pages, and notifies the secured page group (PG) to the page allocation section 26.

The page allocation section 26 in FIG. 2 allocates, to a logical address, each page (physical page) in the storage medium 21 to be used for storing the write data, in response to the request from the access request conversion section 22. Each page to be allocated is a free page included in the page group (PG) secured by the storage region securing section 25.

Using the address conversion section 23, the page allocation section 26 records the ID for the storage medium that stores the free page and the physical address of the free page, with respect to the entry in the address conversion table 231 associated with the logical address to which the free page is allocated.

The performance requirement specifying section 27 records, in the performance requirement table 271, the performance lower limit (minimum performance to be maintained) and the performance upper limit (maximum performance that must not be exceeded) with respect to each write access specified for the storage 2.

The performance requirement specifying section 27 responds to an inquiry about performance requirements of the performance upper and lower limits from each of the access execution section 24 and the storage region securing section 25. When the requirement of the performance lower limit recorded in the performance requirement table 271 is difficult to satisfy, the performance requirement specifying section 27 receives a notification from the store region securing unit 25, and changes the performance lower limit.

The performance requirement table 271 records the performance lower limit and the performance upper limit with respect to each write access to the storage 2 to be managed by the performance requirement specifying section 27.

FIG. 7 illustrates one form of the performance requirement table 271. Referring to FIG. 7, the performance lower limit and the performance upper limit of the storage 2 stored in the performance requirement table 271 are each represented by a throughput. The performance lower limit and the performance upper limit may be, however, each represented by a different index such as an IOPS (I/O per second) for a page write, for example.

The provision capacity determination section 28 in FIG. 2 calculates a capacity that can be provided to the host 1 by the storage 2 within a performance requirement satisfying range, based on the performance upper and lower limits with respect to each write access to the storage 2 specified by the performance requirement specifying section 27 and the capacity and the access performance of the storage medium 21.

Figure 8:
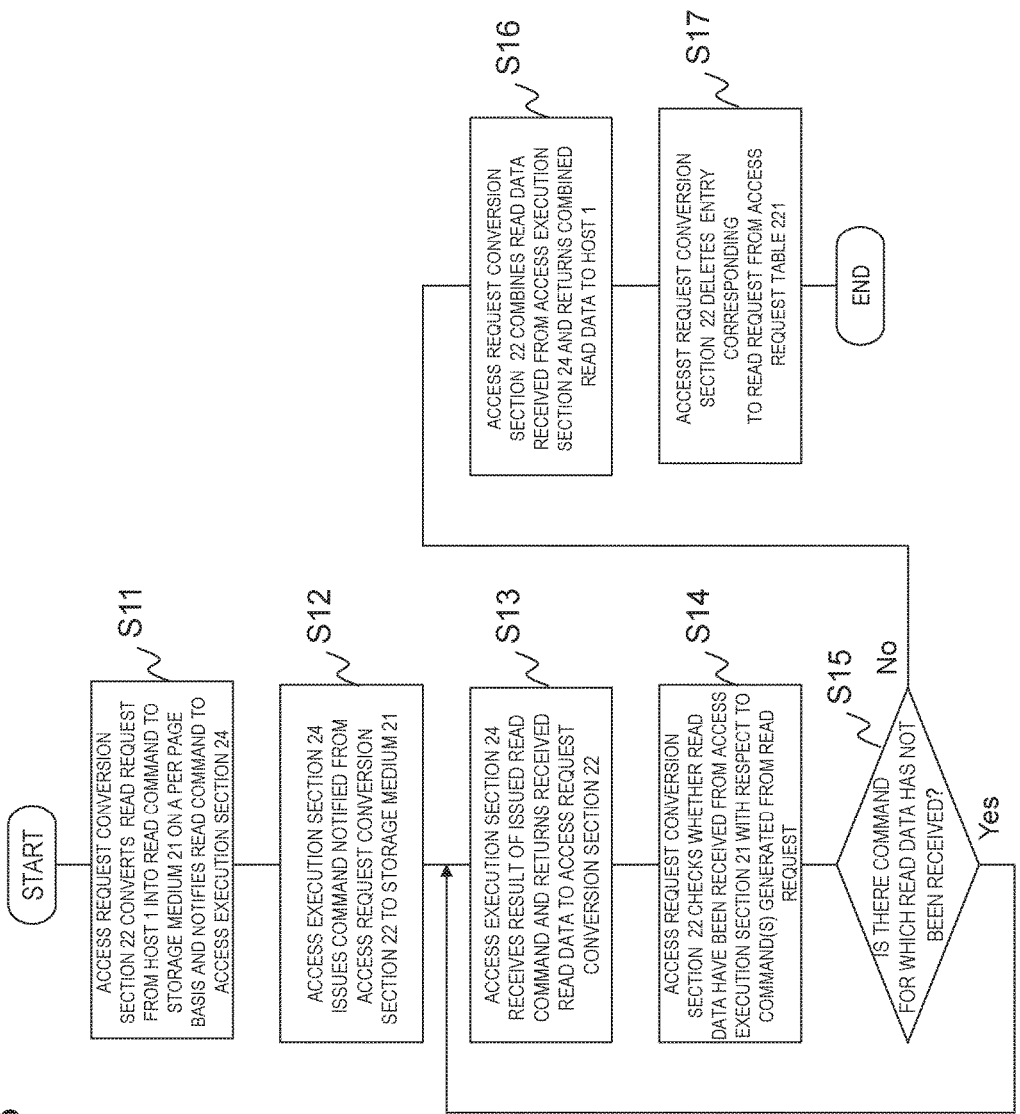
FIG. 8 is a flowchart for explaining an example of an operation of processing a read request from a host by the storage in the exemplary embodiment of the present invention.

Next, operation of this exemplary embodiment will be described. FIG. 8 is a flow diagram explaining operations for a read request from the host 1 in this exemplary embodiment. The operations for the read request from the host 1 in the exemplary embodiment of the present invention will be explained, with reference to FIGS. 1 to 5 and FIG. 8.

<Step S11>

The access request conversion section 22 receives the read request made from the host 1 to the storage 2. The access request conversion section 22 refers to the address conversion table 231 of the address conversion section 23 to convert the read request into a read command to the storage medium 21 for each page. The access request conversion section 22 registers in the access request table 221 the read command obtained by the conversion, and notifies the read command to the access execution section 24.

<Step S12>

The access execution section 24 registers the read command notified in step S11 in the command table 241 and issues the read command to the storage medium 21.

<Step S13>

Upon reception of a result of a read (Read data) from the storage medium 21 for each command issued in step S12, the access execution section 24 returns to the access request conversion section 22 the read data read from the storage medium 21. The access execution section 24 erases from the command table 241 the entry for the read command for which the result of the read from the storage medium 21 the access execution section 24 has received.

<Step S14>

Upon reception of the read data that is a result of execution of the read command from the access execution section 24, the access request conversion section 22 refers to the access request table 221 to check whether or not the process(es) of the read command(s)indicated by the corresponding command ID(s) are all completed with respect to the access request (read request) associated with the read command(s). That is, the access request conversion section 22 checks whether or not the access request conversion section 22 has received the read data from the access execution section 24 with respect to each read command generated from the read request.

<Step S15>

If the process(es) of the read command(s) indicated by the corresponding command ID(s) in the access request have not been all completed (determination of Yes in step S15), the access execution section 24 executes the process in step S13. The access request conversion section 22 waits until the other read command(s) associated with the access request are completed and the read data is/are returned from the access execution section 24.

<Step S16>

If the process(es) of the read command(s) indicated by the corresponding command ID(s) in the access request have been all completed (determination of No in step S15), the access request conversion section 22 returns the read data (Read data) that is/are the result(s) of the read command(s) received from the access execution section 24 to the host 1 (in FIG. 1), as read data for the read request. When the access request conversion section 22 receives a plural items of read data from the access execution section 24, the access request conversion section 22 returns a combination of the plural items of read data as a read data for the read request. Specifically, the storage 2 (in FIG. 1) packetizes the read data into data or a file, for transfer to the host 1 via the network 3 (in FIG. 1).

<Step S17>

The access request conversion section 22 erases from the access request table 221 the entry associated with the read request for which the read data has been returned to the host 1 in step S16, and completes the processes of the read request from the host 1.

The operations for the read request made from the host 1 to the storage 2 are completed by the above-mentioned processes from steps S11 to S17.

Figure 9:
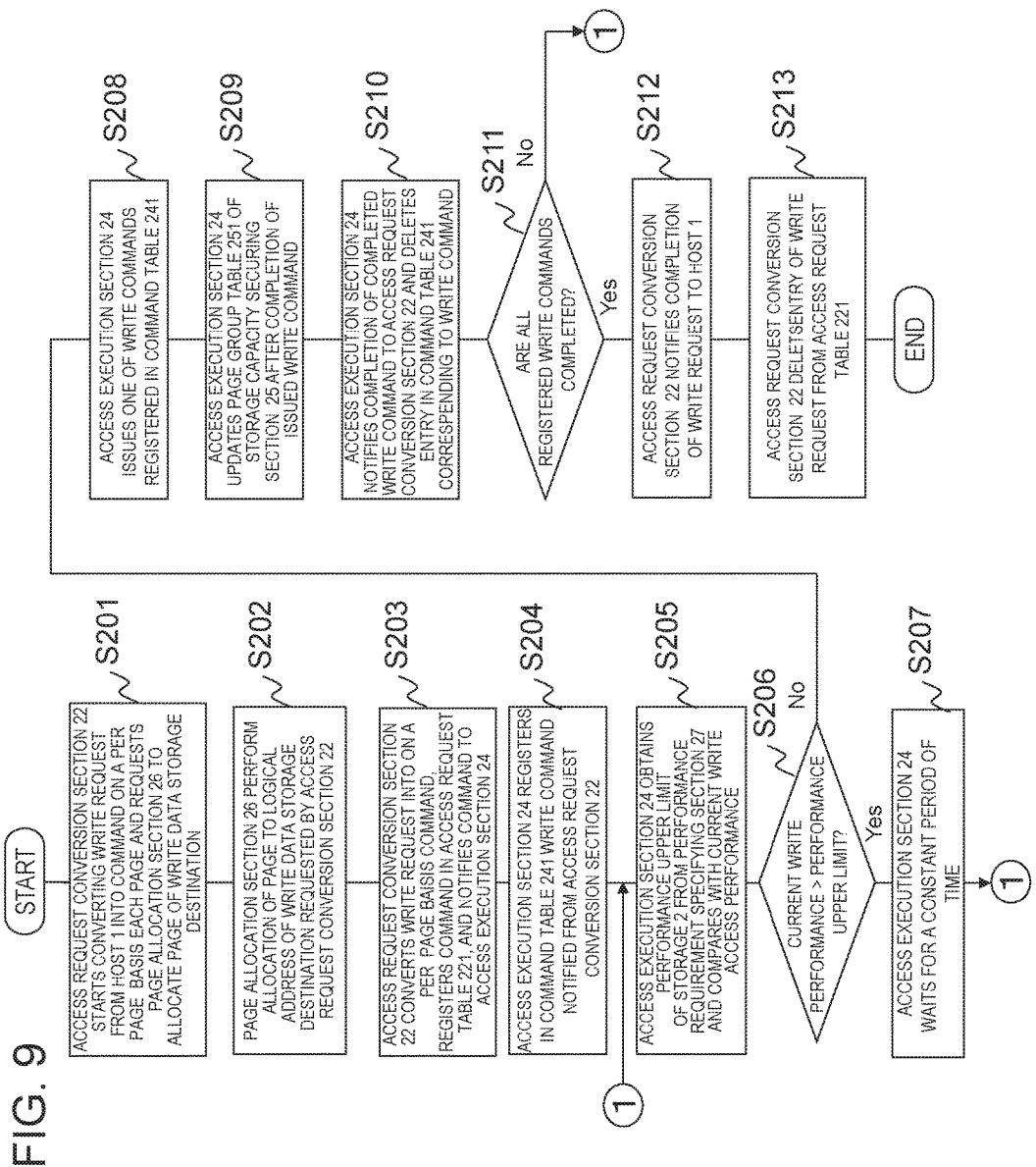
FIG. 9 is a flowchart for explaining an example of an operation of processing a write request from the host by the storage in the exemplary embodiment of the present invention.

FIG. 9 is a flow diagram explaining operations for a write request from the host 1 in this exemplary embodiment. The operations for the write request from the host 1 in this exemplary embodiment will be explained with reference to FIGS. 1 to 6 and FIG. 9.

<Step S201>

The access request conversion section 22 receives the write request made from the host 1 to the storage 2 and write data to be written in response to the request. The access request conversion section 22 refers to the address conversion table 231 of the address conversion section 23 to convert the write request into a write command to the storage medium 21 for each page.

The access request conversion section 22 requests the page allocation section 26 to allocate a page in the storage medium 21 that will become a storage destination of write data associated with the logical address, for each write command obtained by division for each page.

<Step S202>

The page allocation section 26 performs allocation of a page in the storage medium 21 with respect to the logical address of the storage destination of the write data, which has been requested by the access request conversion section 22.

<Step S203>

The access request conversion section 22 refers to the address conversion table 231 of the address conversion section 23 to perform the conversion into a on a per page basis write command to the storage medium 21.

The page allocation section 26 divides the write data received from the host 1 into write data for each page to be accessed by each write command, in association with the write command that has been converted into the on a per page basis command. When the write request is converted into 10 on a per page basis write commands by the access request conversion section 22, the page allocation section 26 divides the write data received from the host 1 into 10 pieces of the write data, in association with the on a per page basis write commands.

The access request conversion section 22 registers in the access request table 221 each on a per page basis write command obtained by the conversion, and notifies to the access execution section 24 each on a per page basis write command together with the write data for each page associated with each on a per page basis write command.

<Step S204>

The access execution section 24 registers in the command table 241 the write command notified from the access request conversion section 22 in step S203.

<Step S205: Connector 1>

The access execution section 24 obtains from the performance requirement specifying section 27 the performance upper limit of the storage 2 with respect to each write access, and compares the performance upper limit with current write access performance of the storage 2. The write access performance may be write access performance of the storage 2 immediately (before (at a most recent time) when the write command has been received, for example. The write access performance is given by the above-listed Expression (5), and a set value at that point of time is used for each parameter.

<Step S206>

If the current write access performance of the storage 2 is greater than or equal to the performance upper limit of the storage 2 (determination of Yes in step S206), the access execution section 24 executes a process in step S207. If the current write access performance of the storage 2 is lower than the performance upper limit of the storage 2 (determination of No in step S206), the access execution section 24 executes processes in and after step S208.

<Step S207>

The access execution section 24 waits for a predetermined period of time (arbitrary period of time) set in advance and returns to step S205 (via connector 1) to execute the process. By idling the access execution section 24, the write access performance is reduced to be equal to or lower than the performance upper limit.

<Step S208>

With respect to one of the commands registered in step S204, the access execution section 24 issues to the storage medium 21 the write command, together with the write data received in association with each command.

<Step S209>

Upon reception of notification of completion of a write from the storage medium 21 with respect to the command issued in step S208, the access execution section 24 updates the allocation information in the page group table 251 associated with the page of the access destination in the write command to the state of "allocated" through the storage capacity securing unit 25.

<Step S210>

The access execution section 24 notifies to the access request conversion section 22 completion of the processes of the write command for which the notification of completion has been received in step S209.

The access execution section 24 erases from the command table 241 the entry associated with the command for which the write has been completed.

<Step S211>

If execution of the command(s) registered in step S204 is not completed (determination of No in step S211), the access execution section 24 returns to step S205 (via connector 1), and executes the process. On the other hand, if execution of the command(s) registered in step S204 is all completed (determination of Yes in step S211), the procedure proceeds to step S212.

<Step S212>

This step is in a state where completion of all of the write command(s) associated with the write request from the host 1 has been notified, and the access request conversion section 22 responds completion of the write request to the host 1.

<Step S213>

The access request conversion section 22 erases from the access request table 221 the entry for the access request of which the completion has been notified in step S212, and completes the processes of the write request from the host 1.

By executing the above-mentioned processes from step S201 to step S213, the operations of the present invention for the processes of the write request made from the host 1 to the storage 2 are completed. Though the access execution section 24 issues one of the commands for the storage medium 21 in step S208, it may be so arranged that the access execution section 24 simultaneously issues a plurality of the commands.

Figure 10:
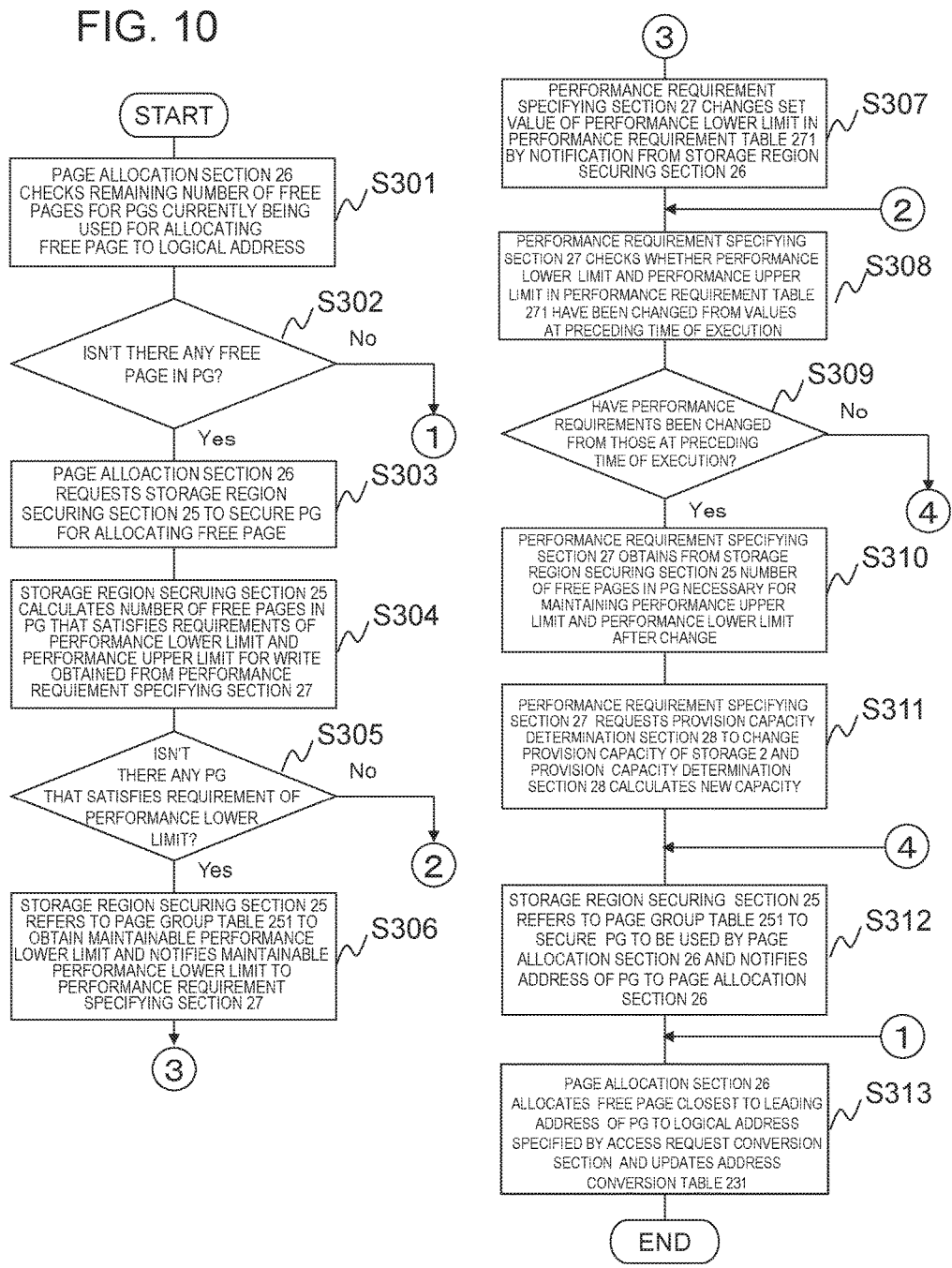
FIG. 10 is a flowchart for explaining an example of an operation of allocating a page in a storage medium to a storage destination of write data in the exemplary embodiment of the present invention.

FIG. 10 is a flow diagram explaining operations of the page allocation section 26 in step S202 in FIG. 9. The detailed operations of the page allocation section 26 in step S202 in FIG. 9 will be explained with reference to FIGS. 1 to 7, FIG. 9, and FIG. 10.

<Step S301>

The page allocation section 26 refers to the page group table 251 of the storage region securing section 25 to check whether or not one or more free pages are present with respect to the page group (PG) that has been specified by the storage region securing section 25 and may include one or more free pages to be newly allocated to the logical address.

<Step S302>

If the one or more free pages are present (determination of No in step S302), the page allocation section 26 executes a process in step S313 and the processes after step S313 (via connector 1). If the one or more free pages are not present (determination of Yes in step S302), the page allocation section 26 proceeds to a process in step S303.

<Step S303>

The page allocation section 26 requests the storage region securing section 25 to secure a page group (PG) including one or more free pages to be allocated to the logical address.

<Step S304>

The storage region securing section 25, upon reception of the request for securing the page group (PG) from the page allocation section 26, obtains, through the performance requirement specifying section 27, requirements of the performance lower limit and the performance upper limit for each write access to the storage 2, stored in the performance requirement table 271. The storage region securing section 25 determines a range of the number of free pages in the page group (PG) to be secured for allocating each page to a logical address, which becomes necessary for satisfying the requirements of the performance lower limit and the performance upper limit for the write access.

<Step S305>

If a page group (PG) that satisfies the requirement of the number of free pages for obtaining the performance lower limit obtained in step S304 is present (determination of No in step S305), the storage region securing section 25 executes processes in and after step S308 (via connector 2). If a page group (PG) that satisfies the requirement of the number of free pages for obtaining the performance lower limit obtained in step S304 is not present (determination of Yes in step S305), the storage region securing section 26 proceeds to a process in step S306.

<Step S306>

The storage region securing section 25 refers to the page group table 251 to determine a performance lower limit value that can be maintained by the storage 2, based on the number of free pages in each page group (PG) in the storage medium 21 and the performance of the storage medium 21. Subsequently, the storage region securing section 25 notifies the maintainable performance lower limit value to the performance requirement specifying section 27, and notifies that the requirement for the performance lower limit cannot be satisfied.

Then, the procedure proceeds to step S307.

<Step S307>

The performance requirement specifying section 27 receives the notification from the storage region securing section 25 in step S306, and changes the set value of the performance lower limit in the performance requirement table 271.

<Step S308: Connector 2>

The performance requirement specifying section 27 checks whether the set values of the performance lower limit and the performance upper limit in the performance requirement table 271 have been changed from values when step S308 was executed at a preceding time.

<Step S309>

If the set values of the performance lower limit and the performance upper limit in the performance requirement table 271 have not been changed (determination of No in step S309), the performance requirement specifying section 27 executes the processes in and after step S312 (via connector 4). If the set values of the performance lower limit and the performance upper limit in the performance requirement table 271 have been changed (determination of Yes in step S309), the performance requirement specifying section 27 executes the processes in and after step S310.

\<Step S310\>

If the set values of the performance lower limit and the performance upper limit in the performance requirement table 271 have been changed (determination of Yes in step S309), the performance requirement specifying section 27 obtains from the storage region securing section 25 the number of free pages in the page group (PG) necessary for maintaining changed set values of the lower limit and the upper limit.

\<Step S311\>

The performance requirement specifying section 27 requests the provision capacity determination section 28 to change the provision capacity of the storage 2 together with the value of the number of free pages necessary for the page group (PG) obtained in step S310.

The provision capacity determination section 28 newly calculates a capacity that can be provided to the host 1 by the storage 2, based on the value of the number of free pages and the capacity of the storage medium 21 that constitutes the storage 2.

\<Step S312: Connector 4\>

The storage region securing section 25 refers to the page group table 251 to secure an arbitrary one of the page groups (PGs) that satisfies the requirement of the number of free pages obtained in step S304 in order to use the page group for allocation of a page to the logical address by the page allocation section 26, and notifies an address of the secured page group (PG) to the page allocation section 26.

\<Step S313\>

The page allocation section 26 allocates, to the logical address specified by the access request conversion section 22, one or more free pages closest to the leading address of the page group (PG) including free pages to be newly allocated to the logical address. The page allocation section 26 updates the storage medium ID and the physical address associated with the logical address in the address conversion table 231 of the address conversion section 23, using information on the allocated free page, and finishes the operations.

The detailed operations of the page allocation section 26 in step S202 of the present invention are completed by execution of the above-mentioned processes from step S301 to step S313.

The functions and processes of the access request conversion section 22, the address conversion section 23, the page allocation section 26, the access execution section 24, the storage region securing section 25, the performance requirement specifying section 27, and the provision capacity determination section 28 in FIG. 2 in the exemplary embodiment may be partially or wholly implemented by a computer program to be executed by a CPU (Central Processing Unit) that constitutes the storage 2.

Effects

According to this exemplary embodiment, the following arrangements are made:

managing a plurality of pages that are contiguous as each page group (PG);

selecting a page group including one or more free pages that guarantee access performance;

writing write data into pages in the selected page group (including pages with noncontiguous addresses in the page group) by an append write scheme.

With this arrangement, an access performance, which is substantially equivalent to that in the case of access when performing successive writes to pages in the page group (PG), can be implemented without performing a de-fragment process. Further, the access performance is guaranteed by notifying to the host a storage capacity to be provided by the storage medium that has been set to a value which satisfies the requirements of the access performance and by which free pages can be constantly secured. The following describes the effects of the above-mentioned exemplary embodiment in connection with specific examples.

\<First Example\>

An example of processing an access request in a storage 2 will be given, with reference to FIG. 1, FIG. 2, and FIGS. 8 to 15. It is assumed in this example that a host 1 (in FIG. 1) of an access source to the storage 2 (in FIG. 1) is a single host A and a storage medium 21 (in FIG. 2) constituting the storage 2 is single (with ID of 1). Though no particular limitation is imposed, it is assumed in this example that the storage medium 21 is an HDD having a capacity of 1280 GB (Giga Bytes) and a sector size (also referred to as a block size) is 512 Bytes, and that each address is represented with a sector as a unit. Though no particular limitation is imposed, it is assumed that each of an access address (logical address) specified by an access request and a physical address has a 32-bit length represented in terms of a sector (512 Bytes) as unit, and is written in a hexadecimal (hexadecimal) representation. One hexadecimal digit is formed by 4 bits. Accordingly, 32 bits is constituted from 8 hexadecimal digits. A starting "0x" such as in "0x00100000" indicates a hexadecimal representation.

Though no particular limitation is imposed, it is assumed in this example that:

a size of each page in the storage 2 to be used for a logical address and a physical address is 4 KB (Kilo Bytes) (=8 sectors), and a read from and a write to the storage medium 21 (in FIG. 2) of the storage are each performed on a per page basis;

each page group (PG) is constituted from 32 pages;

performance when successive write accesses are performed to the storage medium 21 is 128000 KB/s (Kilo-Bytes/second); and a period of time needed for one access when a random write is performed for each page is 4 ms (milliseconds).

With respect to performance of the storage 2 when the random write for each page has been performed without applying the present invention, since it takes 4 ms to perform the access to one page of 4 KB, access performance of the storage 2 per unit time (per second) is calculated to be 1000 KB as follows:

$$4 \text{ KB/s} \times (1/0.004) = 1000 \text{ KB/s} \qquad (6)$$

$$= 250 \text{ IOPS (IO Per Second)}$$

$$\cong 1 \text{ MB (Mega Byte)/s}$$

In this example, it is assumed that the host A sequentially performs accesses in the following order to the storage 2:

a read access of a data size (access length): 8 KB (2 pages) to a logical address: 0x00001000;

a write access of a data size (access length): 4 KB (1 page) to a logical address: 0x00002000; and a write access of a data size (access length): 4 KB to a logical address: 0x00003000.

First, a read request of the data size: 8 KB from the logical address: 0x00001000 is transmitted from the host A to the storage 2.

An access request conversion section 22 of the storage 2 (in FIG. 2) registers the read request from the host A in an access request table 221A (in FIG. 11) (Read with ID=1 in FIG. 11), and refers to an address conversion table 231A (in FIG. 12) through an address conversion section 23 (in FIG. 2) to convert the read request into an access command for each page.

Referring to the address conversion table 241A in FIG. 12, a read of the data size of 8 KB (2 pages=512 bytes× 16=16 sectors) from the logical address of 0x00001000 is converted into two read commands (where the data size of each read command is 1 page) for two pages with the physical addresses: 0x00100000 and 0x00100008. The two read commands are notified to an access execution section 24, and are registered in a command table 241A (refer to Reads for IDs=1 and 2 in FIG. 13).

The access execution section 24 (in FIG. 2) issues the two read commands for the two pages with the physical addresses: 0x00100000 and 0x00100008 to the storage medium 21, and returns to the access request conversion section 22 read data (each having a data size: 4 KB) respectively read from the two pages in the storage medium 21.

The access request conversion section 22 combines the read data (each having the data size: 4 KB) read from the two pages using the two read commands to return combined data to the host A as a result of the read, and finishes the process of the read request of the data size of 8 KB from the logical address: 0x00001000 transmitted from the host A.

Next, a write request of the data size: 4 KB to the logical address: 0x00002000 is transmitted from the host A to the storage 2.

The access request conversion section 22 of the storage 2 registers the write request in the access request table 221A (Write with ID=2 in FIG. 11), and refers to the address conversion table 231A (in FIG. 12) through the address conversion section 23 to convert the write request into an access command for each page. Though an entry for the read request (Read with ID=1) at the preceding time remains in the access request table 221A (in FIG. 11), this entry is just an entry for convenience of description of the example. Actually, this entry is erased from the access request table 221 when the process of the read request is finished.

A page allocation section 26 (in FIG. 2) allocates one or more free pages that will become a storage destination of write data. In an initial state, a page group (PG) that is a source for selection of free pages are selected is in an unselected state. Thus, the page allocation section 26 requests a storage region securing section 25 (in FIG. 2) to secure a page group (PG), and executes the processes illustrated in and after step S303 in FIG. 10.

The storage region securing section 25 obtains a performance requirement table 271A (in FIG. 15) from the performance requirement specifying section 27 (in FIG. 2). Referring to the performance requirement table 271A in FIG. 15, the following settings are made:
a performance lower limit=10 MB/s; and
a performance upper limit=20 MB/s.

With respect to a number n (positive integer) of free pages for satisfying performance requirements to be determined by the storage region securing section 25,
in the above-mentioned expression (5) about random write access performance):

$$(C \times n) \times (1/(t + N \times C/A)) = (C \times n)/(t + N \times C/A).$$

a page size: C=4 KB,
an average access time: t=0.004,
the number of pages in each page group (PG): N=32,
a capacity: A=128000 KB,
are substituted.

$$(4 \text{ KB} \times n)/(0.004 + 32 \times 4 \text{ KB}/128000 \text{ KB})$$

needs to be
not less than the performance lower limit: 10 MB/s, and
not more than the performance upper limit: 20 MB/s. The performance lower limit of 10 MB/s is 10 times of performance of approximately 1 MB/s obtained by the above-mentioned Expression (6) for the case in which the present invention is not applied.

The number n of free pages in the page group (PG) for satisfying the above-mentioned requirements is not less than 13 and not more than 24.

Referring to a page group table 251A in FIG. 14, it is necessary for the number of free pages to be not less than 13 in order to satisfy the performance lower limit. Thus, it can be found that the page group (PG) with a leading address of 0x00200000 (with 24 pages unused) or the page group (PG) with a leading address of 0x00200300 (with 32 pages unused) should be secured for the page allocation section 26.

Further, the number of free pages needs to be not more than 25 in order to satisfy the performance upper limit. Thus, the storage region securing section 25 secures the page group (PG) with the leading address of 0x00200000 (with 24 pages unused) capable of satisfying all the performance requirements, and notifies the secured page group (PG) to the page allocation section 26.

If the performance lower limit and the performance upper limit set in the performance requirement table 271A in FIG. 15 have been changed, the performance requirement specifying section 27 executes the processes indicated in steps S310 and S311 in FIG. 10.

The performance requirement specifying section 27 obtains the number of free pages in the page group (PG) for satisfying the performance requirements determined by the storage region securing section 25 (in the case of the page group (PG) with the leading address of 0x00200000 (refer to FIG. 14), the number of free pages is 24).

By newly allocating to the write data free pages each of which is not allocated to a logical address, an append write is performed. For this reason, it is necessary that a page group (PG) for allocating free pages should be able to be secured, irrespective of how free pages are distributed in a page group.

Since 13 or more free pages are necessary in a page group (PG) in order to satisfy the requirement of the performance lower limit, it is necessary for one or more page groups (PGs) having 13 or more free pages to be constantly present in the storage medium 21. It is necessary to set a capacity provided by the storage 2 so that free pages are present in the storage medium 21 in a ratio of 13:32 or more to a total capacity of the storage medium 21.

Based on the information (that free pages are present in the storage medium 21 in the ratio of 13/32 or more to the total capacity of the storage medium 21), a provision capacity determination section 28 (in FIG. 2) calculates the capacity to be provided by the storage 2 to be such a value that makes 13/32 of the capacity of the storage medium 21 is occupied by the free pages:

$$1280 \text{ GB} \times (1 - 13/32) = 760 \text{ GB}$$

The page allocation section 26 searches for free pages in the page group (PG) notified from the storage region securing section 25 from the start of the address, and allocates the free pages searched to the logical address of the storage destination of the write data (this logical address is specified by the n write access request from the host).

Since the page (indicated by a most significant bit in a bitmap of allocation information) at the beginning of the page group (PG) with the leading address of 0x00200000 in the page group table 251A is a free page, the page allocation section 26 allocates the page of the page group with the leading address of 0x00200000 to the logical address of 0x00002000 of the write destination notified from the access request conversion section 22.

A corresponding entry in the address conversion table 231A in FIG. 12 is updated through the address conversion section 23. As a result of this update, a physical address corresponding to the logical address: 0x00002000 becomes 0x00200000 in the address conversion table 231A in FIG. 12.

Upon reception of the result of the update in the address conversion table 231A, the access request conversion section 22 converts the write request (Write request with ID=2 in FIG. 11) of the data size: 4 KB (1 page) to the logical address: 0x00002000 into a write command of the data size: 4 KB (1 page) to the physical address: 0x00200000. The access request conversion section 22 notifies the write command to the access execution section 24, and registers the write command in the command table 241A (refer to ID=3 in FIG. 13). Entries for the commands (Reads with IDs=1 and 2) converted from the read request that has been completed remain in the command table 241A as well. These entries are just entries for convenience of description of the example. Actually, these entries are erased when the commands are completed.

The access execution section 24 issues to the storage medium 21 the write command of the data size: 4 KB (1 page) to the page with the physical address: 0x00200000. When the process of the write command to the storage medium 21 is completed, the access execution section 24 notifies the completion of the write command to the access request conversion section 22.

The access execution section 24 updates the allocation information of the page (1 bit at the left end of the allocation information referenced in FIG. 14) at the beginning of the page group (PG) having the leading address of 0x00200000 in the page group table 251A to a binary value of 1 (allocated) through the storage region securing section 25.

Then, the access request conversion section 22 notifies the completion of the write request to the host A, and finishes the process of the write request of the data size 4 KB to the logical address: 0x00002000.

Subsequently, a write request of the data size: 4 KB to the logical address: 0x00003000 is transmitted from the host A to the storage 2. The access request conversion section 22 of the storage 2 registers the write request in the access request table 221A (refer to FIG. 11), and refers to the address conversion table 231A (in FIG. 12) through the address conversion section 23 to convert the write request to an access command for each page.

The page allocation section 26 allocates a free page that will become the storage destination of write data. There remains the free pages in the page group (PG) secured by the storage region securing section 25 in the process of the preceding write request. For this reason, the page allocation section 26 searches for a subsequent one of the free pages in the page group (PG) secured at the preceding time from the start of the address, and allocates the free page searched to the logical address of the storage destination of the write data.

It can be seen that the subsequent free page in the page group (PG) having the leading address of 0x00200000 corresponds to a fourth bit from the left end of the allocation information in the page group table 251A in FIG. 14. Accordingly, it can be seen that the subsequent free page corresponds to a fourth page from the beginning of the page group, or the page with an address of 0x002000018 (in which 0x indicates the hexadecimal representation). Each address is represented with a sector (block) (512 Bytes) as a unit, a page is constituted from 8 sectors, and 3 pages corresponds to 8×3=24 sectors=0x 18. Thus, the leading address of the fourth page is 0x00200018. The page allocation section 26 allocates the page with the leading address: 0x00200018 in the storage medium 21 to the logical address: 0x00003000 that is the write destination notified from the access request conversion section 22. The page allocation section 26 updates a corresponding entry in the address conversion table 231A through the address conversion section 23 (refer to FIG. 12).

Upon reception of a result of the update of the entry in the address conversion table 231A, the access request conversion section 22 converts the write request of the data size: 4 KB (1 page) to the logical address of 0x00003000 into a write command of the data size of one page (4 KB) to the page with the physical address: 0x00200018, notifies the write command to the access execution section 24, and registers the write command in the command table 241A (in FIG. 13). Referring to FIG. 13, an entry for Write with ID=4 and corresponding access ID=4 is the one registered in the command table 241A this time.

The access execution section 24 issues the write command to the storage medium 21. When the write command is completed, the access execution section 24 notifies the completion of the command to the access request conversion section 22.

The access execution section 24 updates the allocation information of the fourth page from the beginning of the page group (PG) with the leading address 0x00200000 in the page group table 251A to a binary value: 1 (allocated), through the storage region securing section 25.

The access request conversion section 22 notifies completion of the write request to the host A, and finishes the process of the write request of the data size: 4 KB to the logical address: 0x00003000.

This example eliminates the need for a de-fragment process, and allows performance, which is about 10 times of performance of approximately 1 MB/s (obtained by the above-mentioned Expression (6)) when the present invention is not applied, to be maintained.

<Second Example>

A second example of the present invention will be described with reference to FIG. 1, FIG. 2, FIGS. 8 to 10, and FIGS. 16 to 20. A basic configuration of the second example is set to be the same as that in the above-mentioned exemplary embodiment, and FIG. 1, FIG. 2, FIG. 8, FIG. 9, FIG. 10, and so on, for example, are referred to. In the second example, as illustrated in FIG. 20, a performance requirement table 271B is provided as the performance requirement table 271 in FIG. 2. An unused page requirement (such as a minimum unused page rate that is an unused page rate lower limit) is set in the performance requirement table 271B. The second example is different from the first example in an access request process.

It is assumed in this example that a host 1 (in FIG. 1) of an access source to a storage 2 (in FIG. 1) is a single host A, and a storage medium 21 (in FIG. 2) constituting the storage 2 is single (with ID: 1). It is assumed that the storage medium 21 is an HDD having a capacity of 1280 GB and a sector size (also referred to as a block size) is 512 B, and that each address is represented with a block as a unit. The size of each page to be used based on the logical address or the physical address of the storage 2 is set to 4 KB (=8 sectors), and a read from and a write to the storage 2 and the storage medium 21 are each performed for each page. It is also assumed that each page group (PG) is constituted from 32 pages, performance when successive writes are performed to the storage medium 21 is 128000 KB/s, and a period of time required for one access when a random write is performed for each page is 4 ms.

As in the example described in the first example, performance of the storage 2 in the case wherein a random write on a per page basis has been performed without applying the present invention is calculated as follows:

$$4 \text{ KB/s} \times (1/0.004) = 1000 \text{ KB/s } (=250 \text{ IOPS}) \quad (7)$$

In the second example, the host A sequentially performs the following accesses to the storage 2:
- a read access of a data size: 8 KB (2 pages) to a logical address of 0x00001000;
- a write access of a data size: 4 KB to a logical address of 0x00002000; and
- a write access of a data size: 4 KB to a logical address of 0x00003000.

First, a read request of the data size: 8 KB from the logical address of 0x00001000 is transmitted from the host A to the storage 2.

The access request conversion section 22 of the storage 2 (in FIG. 2) registers the read request from the host A in the access request table 221B (in FIG. 16) (ID=1 in FIG. 16), and refers to an address conversion table 231B (refer to FIG. 17) through the address conversion section 23 (in FIG. 2) to convert the read request into an access command for each page. Referring to the address conversion table 231B (in FIG. 17), a read of the data size: 8 KB (2 pages=16 sectors) from the logical address of 0x00001000 is converted into two read commands to two pages with respective physical addresses (leading addresses) of 0x00100000 and 0x00100008. The two read commands are notified to the access execution section 24, and are registered in a command table 241B (refer to Reads for IDs=1 and 2 in FIG. 18).

The access execution section 24 (in FIG. 2) issues to the storage medium 21 the two read commands to the two pages. The access execution section 24 returns data (each having a data size: 4 KB) read from the two pages in the storage medium 21 to the access request conversion section 22 (in FIG. 2).

The access request conversion section 22 combines the read data (each having the data size: 4 KB) sent from the access execution section 24 and read from the two pages in the storage medium 21 to return combined data to the host A as a result. Then, the access request conversion section 22 finishes the process of the read request of the data size: 8 KB from the logical address: 0x00001000.

Subsequently, a write request of the data size: 4 KB to the logical address: 0x00002000 is transmitted from the host A to the storage 2. The access request conversion section 22 in the storage 2 registers the write request from the host A in the access request table 221B (in FIG. 16), (Write with ID=2 in FIG. 16), and refers to the address conversion table 231B (in FIG. 17) through the address conversion section 23 to convert the write request to an access command for each page. Though an entry (with the access destination address: 0x00001000) for the read request (Read request) remains in the access request table 221B (in FIG. 16), this entry is just an entry for convenience of description of the example. Actually, this entry is erased when the process of the read request is finished.

The page allocation section 26 (in FIG. 2) allocates a free page that will become a storage destination of write data. In an initial state, a page group (PG) from which a free page is selected is in an unselected state. Thus, the page allocation section 26 requests the storage region securing section 25 (in FIG. 2) to secure a page group (PG), and executes the processes illustrated in and after step S303 in FIG. 10.

The storage region securing section 25 obtains performance requirement information in the performance requirement table 271 (in FIG. 2), through a performance requirement specifying section 27 (in FIG. 2). In this example, the performance requirement table 271 is constituted as the unused page requirement table 271B (in FIG. 20) configured to store an unused page rate lower limit (minimum value). In the example in FIG. 20, the unused page rate lower limit (minimum unused page rate) is set to 50%.

A number n of free pages in the page group (PG: 32 pages) for satisfying a requirement that an unused page rate be 50% or more is 16 or more.

Referring to a page group table 251B (in FIG. 19), it can be seen that securing a page group (PG) with a leading address: 0x00200000 or 0x00200300 for the page allocation section 26 may suffice.

The storage region securing section 25 secures the page group (PG) with the leading address: 0x00200000 that has the larger number of free pages and will increase write access performance, and notifies the secured page group (PG) to the page allocation section 26.

In this example, the minimum unused page for a page group (PG) to be used as a write destination (data storage destination) is defined using an unused page count rate (ratio) in the unused page requirement table 271B (in FIG. 20). The minimum unused page d may be made defined using a value of the number of minimum unused pages included in a page group (PG) to be used as a write destination (data storage destination).

If the minimum unused page rate in a page group (PG) that will become a write destination (data storage destination) stored and held in the unused page requirement table 271B (in FIG. 20) has been changed, the performance requirement specifying section 27 (in FIG. 2) executes the processes illustrated in steps S310 and S311 in FIG. 10. However, "satisfies performance lower limit and performance upper limit" in step S304 in FIG. 10 is replaced by "satisfies performance requirement of being minimum unused page rate or higher" or the like, and "necessary for maintaining performance lower limit and performance upper limit" in step S310 is replaced by "satisfies requirement of being minimum unused page rate or higher".

The performance requirement specifying section 27 obtains the number of free pages in a page group (PG) for satisfying the performance requirement determined by the storage region securing section 25.

In this example, a free page not allocated to a logical address is newly allocated to the write data, thereby performing an append write.

For this reason, it is necessary that a page group (PG) for allocating a free page is able to be secured, irrespective of how free pages are distributed in the page group. That is, a capacity value of a storage capacity to be provided by the storage 2 is set so that one or more of page groups (PGs) each having a free page rate of 50%, that is, 16 or more free pages out of 32 pages are constantly present in the storage medium 21.

Based on the information (that one or more of page groups (PGs) having the 16 free pages or more out of the 32 pages are constantly present in the storage medium 21), a provision capacity determination section 28 (in FIG. 2) calculates the storage capacity to be provided by the storage 2 as the following capacity value that makes 50% of the capacity of the storage medium 21 to be occupied by the free pages:

1280 GB×50% =640 GB

The page allocation section 26 searches for a free page in the page group (PG) notified from the storage region securing section 25 from a start of the address, and allocates the free page searched to a logical address of the storage destination of the write data.

Since the page (indicated by a most significant bit in a bitmap of allocation information) at the beginning of the page group (PG) with the leading address: 0x00200000 in the page group table 251B in FIG. 19 is a free page, the page with the leading address: 0x00200000 in the storage medium 21 is allocated to the logical address of 0x00002000 of the write destination (write data storage destination) notified from the access request conversion section 22. A corresponding entry in the address conversion table 231B is updated through the address conversion section 23 (refer to an entry of the logical address of 0x00002000 in FIG. 17).

Upon reception of a result of the update in the address conversion table 231B, the access request conversion section 22 converts a write of data size: 4 KB to the logical address: 0x00002000 into a write command of data size: 1 page to the physical address: 0x00200000. The access request conversion section 22 notifies the write command to the access execution section 24, and registers the write command in the command table 241B (refer to Write with ID=3 in FIG. 18). Entries for the read commands (Reads for IDs=1 and 2) converted from the read request that has been completed remain in the command table 241B in FIG. 18 as well. These entries are just entries for convenience of description of the example. Actually, these entries are erased when the read commands are completed.

The access execution section 24 issues the write command to the storage medium 21. When the write command is completed, the access execution section 24 notifies the completion of the write command to the access request conversion section 22. The access execution section 24 updates the allocation information of the page at the beginning of the page group (PG) with the leading address: 0x00200000 in the page group table 251B in FIG. 19 to a binary value of 1 (allocated) through the storage region securing section 25. The access request conversion section 22 notifies completion of the write request to the host A, and finishes the process of the write request of the data size 4 KB to the logical address: 0x00002000.

Subsequently, a write of the data size: 4 KB to the logical address: 0x00003000 is requested from the host A to the storage 2.

The access request conversion section 22 of the storage 2 registers the write request in the access request table 221B (in FIG. 16) (Write with ID 3 in FIG. 16), and refers to the address conversion table 231B (in FIG. 17) through the address conversion section 23 to convert the write request to an access command for each page.

The page allocation section 26 allocates a free page that will become a storage destination of write data. There remain free pages in the page group (PG) secured by the storage region securing section 25 in the process of the write request at a preceding time. For this reason, the page allocation section 26 searches for a subsequent one of free pages in the page group (PG) secured at the preceding time, from the start of the address, and allocates a subsequent free page to the logical address of the storage destination of the write data. It can be seen that, in the page group table 251B (in FIG. 19), the subsequent free page in the page group (PG) with the leading address: 0x00200000 is a fourth page from the beginning of the page group, or the page with an address: 0x00200018. Thus, the page allocation section 26 allocates the page with the leading address: 0x00200018 in the storage medium 21 to the logical address: 0x00003000 of the write destination notified from the access request conversion section 22. The page allocation section 26 updates a corresponding entry (entry with the logical address: 0x00003000) in the address conversion table 231B (in FIG. 17) through the address conversion section 23.

Upon reception of a result of the update of the address conversion table 231B (in FIG. 17), the access request conversion section 22 converts a write of the data size: 4 KB to the logical address: 0x00003000 into a write command of the data size: 4 KB (corresponding to 1 page) to a page of a physical address: 0x00200018. The access request conversion section 22 notifies the write command to the access execution section 24, and registers the write command in the command table 241B (Wire with ID=4 in FIG. 19).

The access execution section 24 issues the write command to the storage medium 21. When the write command is completed, the access execution section 24 notifies the completion of the write command to the access request conversion section 22. The access execution section 24 updates the allocation information of the fourth page from the beginning of the page group (PG) with the leading address of 0x00200000 in the page group table 251B (in FIG. 19) to the binary value of 1 (allocated) through the storage region securing section 25.

The access request conversion section 22 notifies completion of the write request to the host A, thereby finishing the process of the write request of the data size: 4 KB to the logical address: 0x00003000.

According to this example, the capacity value of the storage capacity to be provided by the storage is set so that one or more of page groups (PGs) each having a free page rate of 50% or more are constantly present in the storage medium. With this arrangement, in the append write scheme, deterioration of write access performance can be avoided without performing the de-fragment process, as in the first example.

Each disclosure of the above-listed Patent Literatures and the above-listed Non Patent Literatures is incorporated herein by reference. Modification, adjustment, and combination of each exemplary embodiment and each example are possible within the scope of the overall disclosure (including the claims) of the present invention and based on the basic technical concept of the present invention. Various combinations and selections of various disclosed elements (including each element of each claim, each element of each example, each element of each drawing, and the like) are possible within the scope of the claims of the present invention. That is, the present invention naturally includes various variations and modifications that could be made by those skilled in the art according to the overall disclosure including the claims and the technical concept.

The invention claimed is:

1. A storage apparatus comprising:
   at least one storage medium configured to store data;
   an access reception section configured to receive at least a write access request, as an access request from a host to the storage medium;
   a storage region securing section configured to manage collectively a predetermined preset number of contiguously arranged units of storage, as a group, each unit of storage having a predetermined capacity and corresponding to each one of a plurality of pieces into which a storage region of the storage medium is divided, the storage region securing section including a table to manage an allocation status of each unit of storage included in the group, the storage region securing section, when securing a storage region in the storage medium for storing write data specified by the write access request received, selecting one or more groups, the number of the units of storage in a free state included in each of the one or more groups satisfying a specified access performance set condition, wherein the storage region securing section, in selection of the group, sets, a group in which the units of storage in a free state are distributed non-contiguously, to one to be selected, to allow at least two non-contiguous units of storage in a free state included in the group to be allocated for storing the write data, as long as the number of the units of storage in a free state included in the group satisfies the access performance set condition;

an allocation section configured to associate an address specified by the write access request as a storage destination of the write data and an address on the storage medium allocated to at least one of the units of storage in a free state included in the group selected; and an access execution section configured to sequentially write the write data to the unit of storage in a free state included in the group selected by the storage region securing section, in an order of the address of the unit of storage included in the group selected, with the address association thereof performed by the allocation section.

2. The storage apparatus according to claim 1, further comprising a provision capacity determination section configured to variably set a storage capacity provided by the storage medium to a capacity value that enables to secure at least one group including the units of storage in a free state, the number of which is greater than or equal to the number of the units of storage in a free state that satisfies the access performance set condition, the provision capacity determination section notifying, to the host, the capacity value that is set and that can be provided by the storage medium.

3. The storage apparatus according to claim 1, wherein the access reception section includes:

an address conversion section configured to mutually convert the address specified by the access request from the host and the address allocated to a storage region on the storage medium; and an access request conversion section configured to convert the access request from the host to the storage medium into an access command on a per unit of storage basis to the storage medium, each access command using the address allocated to a corresponding unit of storage included in the group selected as the storage region on the storage medium.

4. The storage apparatus according to claim 1, further comprising:

a performance requirement specifying section configured to specify, as the condition regarding access performance:

a lower limit of the access performance;

a lower limit and an upper limit of the access performance; or a lower limit of an unused region rate of the storage medium.

5. The storage apparatus according to claim 4, wherein the storage region securing section determines the number of the units of storage in a free state included in the group from a number for making write access performance to the storage medium fall within a range defined by the lower limit and the upper limit set in advance, when the storage region securing section detects that there is not a group including the number of the units of storage in a free state for making the access performance of a write access greater than or equal to the lower limit, the storage region securing section calculates a lower limit value of the access performance that is able to be maintained by the storage apparatus, based on a number of the units of storage in a free state in the group and performance of the storage medium, the storage region securing section notifies the lower limit value of the access performance to the performance requirement specifying section, and the performance requirement specifying section changes a set value of the lower limit of the access performance, based on the notification from the storage region securing section.

6. The storage apparatus according to claim 1, wherein the storage medium includes a hard disk drive, and a total storage capacity of the predetermined number of the units of storage included in a same group is set to a capacity value equal to a storage capacity corresponding to one track of the hard disk drive or a capacity value calculated based on the storage capacity.

7. A storage apparatus comprising:

at least one storage medium configured to store data;

an access reception section configured to receive at least a write access request, as an access request from a host to the storage medium;

a storage region securing section configured to manage collectively a predetermined preset number of contiguously arranged units of storage, as a group, each unit of storage having a predetermined capacity and corresponding to each one of a plurality of pieces into which a storage region of the storage medium is divided, the storage region securing section, when securing a storage region in the storage medium for storing write data specified by the write access request received, selecting one or more groups, the number of the units of storage in a free state included in each of the one or more groups satisfying a specified access performance set condition, wherein the storage region securing section, in selection of the group, sets, a group in which the units of storage in a free state are distributed non-contiguously, to one to be selected, as long as the number of the units of storage in a free state included in the group satisfies the access performance set condition;

an allocation section configured to associate an address specified by the write access request as a storage destination of the write data and an address on the storage medium allocated to at least one unit of storage in a free state included in the group selected;

an access execution section configured to sequentially write the write data to the unit of storage in a free state included in the group selected by the storage region securing section, with the address association thereof performed by the allocation section; and a provision capacity determination section configured to variably set a storage capacity provided by the storage medium to a capacity value that enables to secure at least one group including the units of storage in a free state, the number of which is greater than or equal to the number of the units of storage in a free state that satisfies the access performance set condition, the provision capacity determination section notifying, to the host, the capacity value that is set and that can be provided by the storage medium, wherein the access reception section includes:

an access request conversion section configured to convert the access request from the host to the storage medium into an access command to the unit of storage of the storage medium and instruct the access execution section to execute the command; and an address conversion section that includes an address conversion table that records a correspondence relationship between each logical address that is used when the host accesses the storage apparatus and a physical address that indicates a storage region on the storage medium corresponding to the logical address, wherein the address conversion section converts the logical address into the physical address when the access request conversion section converts the access request from the host into the access command to the storage medium, and updates the address conversion table upon reception of a request from the allocation section for changing the physical address indicating the storage region on the storage medium corresponding to the logical address, wherein the access execution section issues to the storage medium the access command obtained by the conversion of the access request from the host by the access request conversion section, wherein the storage region securing section includes a table to manage an allocation status of each unit of storage in each of the groups constituted from a plurality of the contiguous units of storage, the storage region securing section determines a physical address that is used as a storage region of the unit of storage in the storage medium and is allocated to the logical address by the allocation section, wherein the allocation section allocates the unit of storage to be used as the storage destination of the write data to a logical address, in response to a request from the access request conversion section, wherein the storage apparatus further comprises:

a performance requirement specifying section that holds in a storage section a lower limit and an upper limit of performance or a lower limit of an unused region rate specified for the storage apparatus and to be maintained for a write access, wherein the provision capacity determination section calculates a capacity that is able to be provided to the host by the storage apparatus in a range satisfying a performance requirement, based on the lower limit and the upper limit for the write access to the storage apparatus specified by the performance requirement specifying section, a capacity of the storage medium, and access performance.

8. A method for access control in a storage apparatus including at least a storage medium configured to store data, the method comprising:

managing collectively a predetermined preset number of contiguously arranged units of storage, as a group, each unit of storage having a predetermined capacity and corresponding to each one of a plurality of pieces into which a storage region of the storage medium is divided, using a table to manage an allocation status of each unit of storage included in the group, when securing a storage region in the storage medium for storing write data in response to a write access request to the storage medium received from a host, selecting one or more groups, the number of the units of storage in a free state included in each of the one or more groups satisfying a specified access performance set condition, in selection of the group, setting, a group in which the units of storage in a free state are distributed non-contiguously, to one to be selected, to allow at least two non-contiguous units of storage in a free state included in the group to be allocated for storing the write data, as long as the number of the units of storage in a free state included in the group satisfies the access performance set condition;

associating an address specified by the write access request as a storage destination of the write data and an address on the storage medium allocated to at least one of the units of storage in a free state included in the group selected; and sequentially writing the write data to the units of storage in a free state included in the group selected, in an order of the address of the unit of storage included in the group selected, with association of the address thereof performed.

9. The method according to claim 8, comprising:

variably setting a storage capacity that may be provided by the at least one storage medium to a capacity value that enables to secure at least one group including the units of storage in a free state, the number of which is greater than or equal to the number of the units of storage in a free state that satisfies the access performance set condition; and notifying, to the host, the capacity value set and provided by the storage medium.

10. The method according to claim 8, comprising:

mutually converting the address specified by the access request from the host and the address allocated to one of the storage regions on the storage medium; and converting the access request from the host to the storage medium into an access command on a per unit of storage basis to the storage medium, each access command using the address allocated to a corresponding unit of storage included in the group selected as the storage region on the storage medium.

11. The method according to claim 8, comprising:

specifying, as the condition regarding access performance:

a lower limit of the access performance;

a lower limit and an upper limit of the access performance; or a lower limit of an unused region rate of the storage medium.

12. The method according to claim 11, comprising:

determining the number of the units of storage in a free state included in a group of the units of storage, from a number for making write access performance fall within a range defined by the lower limit and the upper limit of the access performance; and when there is not a group of the units of storage including the number of the units of storage for making the access performance of a write access greater than or equal to the lower limit, determining a lower limit value of the access performance that may be maintained by the storage apparatus based on a number of the units of storage in the free state in the group of the units of storage in the storage medium and performance of the at least one storage medium; and changing a set value of the lower limit of the access performance to the determined lower limit value.

13. The method according to claim 8, wherein the storage medium includes a hard disk drive, the method comprising:

setting a total storage capacity of the predetermined number of the units of storage in the storage regions that are contiguous and included in a same one of the groups to a storage capacity corresponding to one track of the hard disk drive or a capacity value calculated based on the storage capacity.

14. A non-transitory computer readable recording medium storing therein a program to cause a computer constituting a storage apparatus including at least one storage medium to store data, to execute:

an access reception process that receives at least a write access request, as an access request from a host to the storage medium;

a storage region securing process that manages collectively a predetermined preset number of units of storage included in contiguous storage regions, each unit of storage having a predetermined capacity and corresponding to each one of being each of a plurality of pieces into which a storage region of the storage medium is divided, using a table to manage an allocation status of each unit of storage included in the group, the storage region securing process, when securing a storage region in the storage medium for storing write data in response to the write access request received, selecting one or more groups, the number of the units of storage in a free state included in each of the one or more groups satisfying a specified access performance set condition, wherein the storage region securing process, in selection of the group, sets, a group in which the units of storage in a free state are distributed non-contiguously, to one to be selected, to allow at least two non-contiguous units of storage in a free state included in the group to be allocated for storing the write data, as long as the number of the units of storage in a free state included in the group satisfies the access performance set condition;

an allocation process that associates an address specified by the write access request as a storage destination of the write data and an address on the storage medium allocated to at least one unit of storage in a free state included in the group selected; and an access execution process that sequentially writes the write data to the unit of storage in a free state included in the group selected by the storage region securing process, in an order of the address of the unit of storage included in the group selected, with the address association thereof performed by the allocation process.

15. The non-transitory computer readable recording medium according to claim 14, storing therein the program causing the computer to execute:

a provision capacity determination process that variably sets a storage capacity that may be provided by the storage medium to a capacity value that may ensure at least one of the groups including a number of the units of storage in a free state greater than or equal to the number of the units of storage in a free state that satisfies the access performance set condition, and notifies, to the host, the capacity value that has been set and may be provided by the storage medium.

16. The non-transitory computer readable recording medium according to claim 14, storing therein the program causing the computer to execute:

an address conversion process that mutually converts a first address specified by an access from the host and a second address for each of the units of storage in the storage medium; and an access request conversion process that converts the access request from the host to the storage medium into an access command to the storage medium, the access command using the address allocated to the storage region on the storage medium.

17. The non-transitory computer readable recording medium according to claim 14, storing therein the program causing the computer to execute:

a performance requirement specifying process that specifies, as the condition regarding access performance:

a lower limit of the access performance;

a lower limit and an upper limit of the access performance; or a lower limit of an unused region rate of the storage medium.

18. The non-transitory computer readable recording medium according to claim 17, wherein in the storage region securing process, the number of the units of storage in a free state included in the group of the units of storage is determined from a number for causing write access performance to be within a range defined by the lower limit and the upper limit of the access performance, and when there is not a group including the number of the units of storage for making the access performance of the access for a write to be greater than or equal to the lower limit, a lower limit value of the access performance that may be maintained by the storage apparatus is calculated based on a number of the units of storage in the free state in the group of the units of storage in the storage medium and performance of the at least one storage medium, and is notified to the performance requirement specifying process; and in the performance requirement specifying process, a set value of the lower limit of the access performance is changed to the notified lower limit value.

19. The non-transitory computer readable recording medium according to claim 14, wherein the storage medium includes a hard disk drive, and wherein the program causes the computer to execute:

a process that sets a total storage capacity of the predetermined number of the units of storage in the storage regions that are contiguous and included in a same one of the groups to a storage capacity corresponding to one track of the hard disk drive or a capacity value calculated based on the storage capacity.

20. A non-transitory computer readable recording medium storing therein a program to cause a computer constituting a storage apparatus including at least one storage medium to store data, to execute:

an access reception process that receives at least a write access request, as an access request from a host to the at least a storage medium configured to store data;

a storage region securing process that manages collectively a predetermined preset number of units of storage included in contiguous storage regions, each unit of storage having a predetermined capacity and corresponding to each one of being each of a plurality of pieces into which a storage region of the storage medium is divided, the storage region securing process, when securing a storage region in the storage medium for storing write data in response to the write access request received, selecting one or more groups, the number of the units of storage in a free state included in each of the one or more groups satisfying a specified access performance set condition, wherein the storage region securing process, in selection of the group, sets, a group in which the units of storage in a free state are distributed non-contiguously, to one to be selected, as long as the number of the units of storage in a free state included in the group satisfies the access performance set condition;

an allocation process that associates an address specified by the write access request as a storage destination of the write data and an address on the storage medium allocated to at least one unit of storage in a free state included in the group selected;

an access execution process that sequentially writes the write data to the unit of storage in a free state included in the group selected by the storage region securing process and with the address association performed by the allocation process; and a provision capacity determination process that variably sets a storage capacity that may be provided by the storage medium to a capacity value that may ensure at least one of the groups including a number of the units of storage in a free state greater than or equal to the number of the units of storage that satisfies the access performance set condition, and notifies, to the host, the capacity value that has been set and may be provided by the storage medium, wherein the access receiving process includes:

an access request conversion process that converts the access request from the host to the storage medium into an access command to the unit of storage of the storage medium and instructing the access execution section to execute the command; and an address conversion process including an address conversion table that records a correspondence relationship between each logical address to be used when the host accesses the storage apparatus and a physical address indicating one of the storage regions on the storage medium corresponding to the logical address, the address conversion process converting the logical address into the physical address when the access request from the host is converted into the access command to the storage medium in the access request conversion process, and updating the address conversion table upon receipt of a request from the allocation process for changing the physical address indicating the storage region on the storage medium corresponding to the logical address;

the access execution process issuing the access command obtained by the conversion of the access request from the host in the access request conversion process to the storage medium;

the storage region securing process managing an allocation status of each unit of storage in each of the groups constituted from a plurality of the contiguous storage regions, and determining the physical address to be used as the storage region of the unit of storage in the storage medium and to be allocated to the logical address by the allocation process;

the allocation process allocating the unit of storage in the storage medium to be used for storing the write data to the logical address, in response to a request from the access request conversion process, wherein the program further comprises:

a performance requirement specifying process that holds a lower limit and an upper limit of performance or a lower limit of an unused region rate specified for the storage apparatus and to be maintained for a write access, the provision capacity determination process calculating the capacity that may be provided to the host by the storage apparatus in a performance requirement satisfying range, based on the lower limit and the upper limit for the write access to the storage apparatus specified in the performance requirement specifying process, a capacity of the at least one storage medium, and access performance.

21. A storage apparatus comprising:

at least one storage medium configured to store data;

an access reception section configured to receive at least a write access request, as an access request from a host to the storage medium;

a storage region securing section configured to manage collectively a predetermined preset number of contiguously arranged units of storage, as a group, each unit of storage having a predetermined capacity and corresponding to each one of a plurality of pieces into which a storage region of the storage medium is divided, the storage region securing section, when securing a storage region in the storage medium for storing write data specified by the write access request received, selecting one or more groups, the number of the units of storage in a free state included in each of the one or more groups satisfying a specified access performance set condition, wherein the storage region securing section, in selection of the group, sets, a group in which the units of storage in a free state are distributed non-contiguously, to one to be selected, as long as the number of the units of storage in a free state included in the group satisfies the access performance set condition;

an allocation section configured to associate an address specified by the write access request as a storage destination of the write data and an address on the storage medium allocated to at least one unit of storage in a free state included in the group selected;

an access execution section configured to sequentially write the write data to the unit of storage in a free state included in the group selected by the storage region securing section, with the address association thereof performed by the allocation section; and a provision capacity determination section configured to variably set a storage capacity provided by the storage medium to a capacity value that enables to secure at least one group including the units of storage in a free state, the number of which is greater than or equal to the number of the units of storage in a free state that satisfies the access performance set condition, the provision capacity determination section notifying, to the host, the capacity value that is set and that can be provided by the storage medium, wherein the access reception section includes:

an access request conversion section configured to convert the access request from the host to the storage medium into an access command to the unit of storage of the storage medium and instruct the access execution section to execute the command; and an address conversion section that includes an address conversion table that records a correspondence relationship between each logical address that is used when the host accesses the storage apparatus and a physical address that indicates a storage region on the storage medium corresponding to the logical address, wherein the address conversion section converts the logical address into the physical address when the access request conversion section converts the access request from the host into the access command to the storage medium, and updates the address conversion table upon reception of a request from the allocation section for changing the physical address indicating the storage region on the storage medium corresponding to the logical address, wherein the access execution section issues to the storage medium the access command obtained by the conversion of the access request from the host by the access request conversion section, wherein the storage region securing section includes a table to manage an allocation status of each unit of storage in each of the groups constituted from a plurality of the contiguous units of storage, the storage region securing section determines a physical address that is used as a storage region of the unit of storage in the storage medium and is allocated to the logical address by the allocation section, wherein the allocation section allocates the unit of storage to be used as the storage destination of the write data to a logical address, in response to a request from the access request conversion section, wherein the storage apparatus further comprises:

a performance requirement specifying section that holds in a storage section a lower limit and an upper limit of performance or a lower limit of an unused region rate specified for the storage apparatus and to be maintained for a write access, wherein the provision capacity determination section calculates a capacity that is able to be provided to the host by the storage apparatus in a range satisfying a performance requirement, based on the lower limit and the upper limit for the write access to the storage apparatus specified by the performance requirement specifying section, a capacity of the storage medium, and access performance.

* * * * *